United States Patent
Inoue et al.

(10) Patent No.: US 9,908,793 B2
(45) Date of Patent: Mar. 6, 2018

(54) BALLAST WATER TREATMENT APPARATUS AND BALLAST WATER MANAGEMENT SYSTEM

(71) Applicant: SUMITOMO ELECTRIC INDUSTRIES, LTD., Osaka-shi, Osaka (JP)

(72) Inventors: Hiroki Inoue, Osaka (JP); Ryoji Harada, Osaka (JP); Kenichiro Miyatake, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 186 days.

(21) Appl. No.: 14/429,900

(22) PCT Filed: May 14, 2014

(86) PCT No.: PCT/JP2014/062826
§ 371 (c)(1),
(2) Date: Mar. 20, 2015

(87) PCT Pub. No.: WO2014/188929
PCT Pub. Date: Nov. 27, 2014

(65) Prior Publication Data
US 2015/0225257 A1    Aug. 13, 2015

(30) Foreign Application Priority Data

May 23, 2013    (JP) .................................. 2013-108767

(51) Int. Cl.
*C02F 1/32* (2006.01)
*B01D 29/64* (2006.01)
(Continued)

(52) U.S. Cl.
CPC ............ *C02F 1/32* (2013.01); *B01D 29/6438* (2013.01); *B63J 4/002* (2013.01); *C02F 1/325* (2013.01);
(Continued)

(58) Field of Classification Search
CPC ...... C02F 1/32; C02F 1/325; C02F 2103/008; C02F 2201/326
See application file for complete search history.

(56) References Cited

U.S. PATENT DOCUMENTS

| | | |
|---|---|---|
| 3,468,423 A | 9/1969 | Le Pechon |
| 2004/0134861 A1 | 7/2004 | Brodie |

(Continued)

FOREIGN PATENT DOCUMENTS

| | | |
|---|---|---|
| CN | 101948204 A | 1/2011 |
| CN | 102367189 A | 3/2012 |

(Continued)

OTHER PUBLICATIONS

English Machine Translation of JP2010207796, translated Jun. 2017.*

(Continued)

*Primary Examiner* — Terry K Cecil
(74) *Attorney, Agent, or Firm* — Drinker Biddle & Reath LLP

(57) ABSTRACT

A ballast water treatment apparatus includes a filtering device including a filter for filtering seawater, an ultraviolet irradiation device that irradiates the seawater filtered by the filter with ultraviolet light, a first path for supplying the seawater filtered by the filtering device to the ultraviolet irradiation device, a discharge water path for discharging the seawater remaining in the filtering device, a first valve provided in the first path, a second path for supplying the seawater flowing from the ultraviolet irradiation device to a (Continued)

ballast tank, and a control device that closes the first valve and cleans the filter by using the seawater introduced into the filtering device before the seawater filtered by the filtering device is supplied to the ultraviolet irradiation device.

4 Claims, 26 Drawing Sheets

(51) Int. Cl.
*B63J 4/00* (2006.01)
*C02F 1/00* (2006.01)
*C02F 103/00* (2006.01)
*C02F 103/08* (2006.01)

(52) U.S. Cl.
CPC ........ *C02F 1/004* (2013.01); *C02F 2103/008* (2013.01); *C02F 2103/08* (2013.01); *C02F 2201/32* (2013.01); *C02F 2201/326* (2013.01); *C02F 2209/006* (2013.01); *C02F 2209/40* (2013.01); *C02F 2301/043* (2013.01); *C02F 2303/04* (2013.01)

(56) References Cited

U.S. PATENT DOCUMENTS

| 2005/0000911 | A1 | 1/2005 | Thorpe |
| 2008/0190826 | A1 | 8/2008 | Miner et al. |
| 2009/0321365 | A1 | 12/2009 | Eriksson et al. |
| 2011/0240564 | A1 | 10/2011 | Mueller et al. |
| 2012/0279926 | A1 | 11/2012 | Riggers |

FOREIGN PATENT DOCUMENTS

| CN | 102369050 | A | | 3/2012 |
| CN | 102923292 | A | | 2/2013 |
| EP | 2 540 369 | A1 | | 1/2013 |
| JP | S61-140933 | A | | 6/1986 |
| JP | 2001-029943 | A | | 2/2001 |
| JP | 2005-088835 | A | | 4/2005 |
| JP | 2008-212851 | A | | 9/2008 |
| JP | 2008-212852 | A | | 9/2008 |
| JP | 2010-094584 | A | | 4/2010 |
| JP | 2010207796 | A | * | 9/2010 |
| JP | 2011-194396 | A | | 10/2011 |
| JP | 2012-217966 | A | | 11/2012 |
| JP | 2013-023187 | A | | 2/2013 |
| JP | 2013-043143 | A | | 3/2013 |
| JP | 2013-043488 | A | | 3/2013 |
| WO | WO 03/059821 | A1 | | 7/2003 |
| WO | WO-2012/061924 | A1 | | 5/2012 |
| WO | WO-2012/061924 | A8 | | 5/2012 |

OTHER PUBLICATIONS

U.S. Appl. No. 14/429,921, Sumitomo Electric Industries, Ltd. Office Action dated Jan. 21, 2016 in U.S. Appl. No. 14/429,921 including Double Patenting Rejections on pp. 2 and 3.

* cited by examiner

| APPARATUS MAIN BODY SIDE | BRIDGE SIDE | LAMP | STATE OF LAMP | STATE OF TREATMENT APPARATUS |
|---|---|---|---|---|
| BWMS | BWMS | BWMS ENABLE LAMP | SWITCHED ON | CAN BE USED (BWMS MODE) |
| BYPASS | BYPASS | BYPASS LAMP | SWITCHED ON | CANNOT BE USED (BYPASS MODE) |
| BWMS | BYPASS | BWMS ENABLE LAMP | BLINKING | CANNOT BE USED |
| BYPASS | BWMS | | | | ure ballast water treatment apparatus and ballast water management system

BALLAST WATER TREATMENT APPARATUS AND BALLAST WATER MANAGEMENT SYSTEM

TECHNICAL FIELD

The present invention relates to an apparatus for treating ballast water stored in a ship and a ballast water management system including an apparatus for treating ballast water.

BACKGROUND ART

Ballast water is seawater or the like carried in a ship to provide safe voyage in the sea when the ship carries no cargo. Ballast water is taken up from a seawater environment around a ship at a departure port of the ship and loaded into the ship. The ballast water is discharged around the ship at a destination port of the ship.

The ballast water is discharged into a seawater environment different from a seawater environment where the ballast water is taken up. Organisms in the ballast water are transported to a seawater environment different from their original habitat, resulting in a problem in that the organisms in the ballast water affect the ecosystem in the seawater environment into which the ballast water is discharged.

In order to solve this problem, various methods for performing a purification treatment of ballast water have been developed. For example, Japanese Unexamined Patent Application Publication No. 2013-23187 (PTL 1) discloses a ballast water treatment apparatus for the purpose of reliably and efficiently conducting a treatment for rendering ballast water harmless. This treatment apparatus includes a filter and an ultraviolet irradiation unit. Untreated water introduced into a ballast water treatment line is first allowed to pass through the filter. Next, the untreated water passes through the ultraviolet irradiation unit. While the untreated water passes through the ultraviolet irradiation unit, the untreated water is irradiated with ultraviolet light. Consequently, the untreated water is sterilized.

The above apparatus is provided in order to solve a problem in that the amount of ultraviolet irradiation is insufficient in a state where untreated water has a very high turbidity. Specifically, the treatment apparatus disclosed in the above document discharges pumped untreated water around a ship without allowing the untreated water to pass through the ultraviolet irradiation unit until the illuminance of an ultraviolet lamp reaches a predetermined value. When the illuminance of the ultraviolet lamp reaches the predetermined value, the pumped untreated water is allowed to pass through the ultraviolet irradiation unit and poured into a ballast tank.

CITATION LIST

Patent Literature

PTL 1: Japanese Unexamined Patent Application Publication No. 2013-23187

SUMMARY OF INVENTION

Technical Problem

According to Japanese Unexamined Patent Application Publication No. 2013-23187 (PTL 1), untreated water flows in a path that bypasses the filter until the illuminance of the ultraviolet lamp reaches a predetermined value. When the illuminance of the ultraviolet lamp reaches the predetermined value, the untreated water is allowed to pass through the filter. The above document describes that an effect of reducing clogging of the filter is obtained by this method.

However, at the time when the untreated water is allowed to pass through the filter, the filtration performance of the filter may not be necessarily good. A low filtration performance of the filter results in a problem of, for example, a decrease in the performance for treating ballast water.

An object of the present invention is to provide a technique capable of enhancing the performance of a purification treatment of ballast water during ballast water uptake.

Solution to Problem

A ballast water treatment apparatus according to an aspect of the present invention includes a filtering device including a filter for filtering seawater, an ultraviolet irradiation device that irradiates the seawater filtered by the filter with ultraviolet light, a first path for supplying the seawater filtered by the filtering device to the ultraviolet irradiation device, a discharge water path for discharging the seawater remaining in the filtering device, a first valve provided in the first path, a second path for supplying the seawater flowing from the ultraviolet irradiation device to a ballast tank, and a control device. The control device closes the first valve and cleans the filter by using the seawater introduced into the filtering device before the seawater filtered by the filtering device is supplied to the ultraviolet irradiation device.

According to this configuration, it is possible to enhance the performance of a purification treatment of ballast water during ballast water uptake. During the purification treatment of ballast water, filtration of seawater by the filtering device and ultraviolet irradiation of the seawater by the ultraviolet irradiation device are performed. By cleaning the filter of the filtering device prior to this purification treatment, it is possible to reduce the possibility of poor filtration performance of the filter at the time of starting the purification treatment. Accordingly, the performance of a purification treatment of ballast water can be enhanced.

A ballast water management system according to another aspect of the present invention includes the above ballast water treatment apparatus, a pump for supplying the seawater to the filtering device, and a ballast tank for storing the seawater supplied through the second path.

According to this configuration, the performance of a purification treatment of ballast water can be enhanced. Accordingly, an increase in the time necessary for storing ballast water in the ballast tank can be prevented.

Advantageous Effects of Invention

According to the present invention, it is possible to enhance the performance of a purification treatment of ballast water during ballast water uptake.

Figure 1:
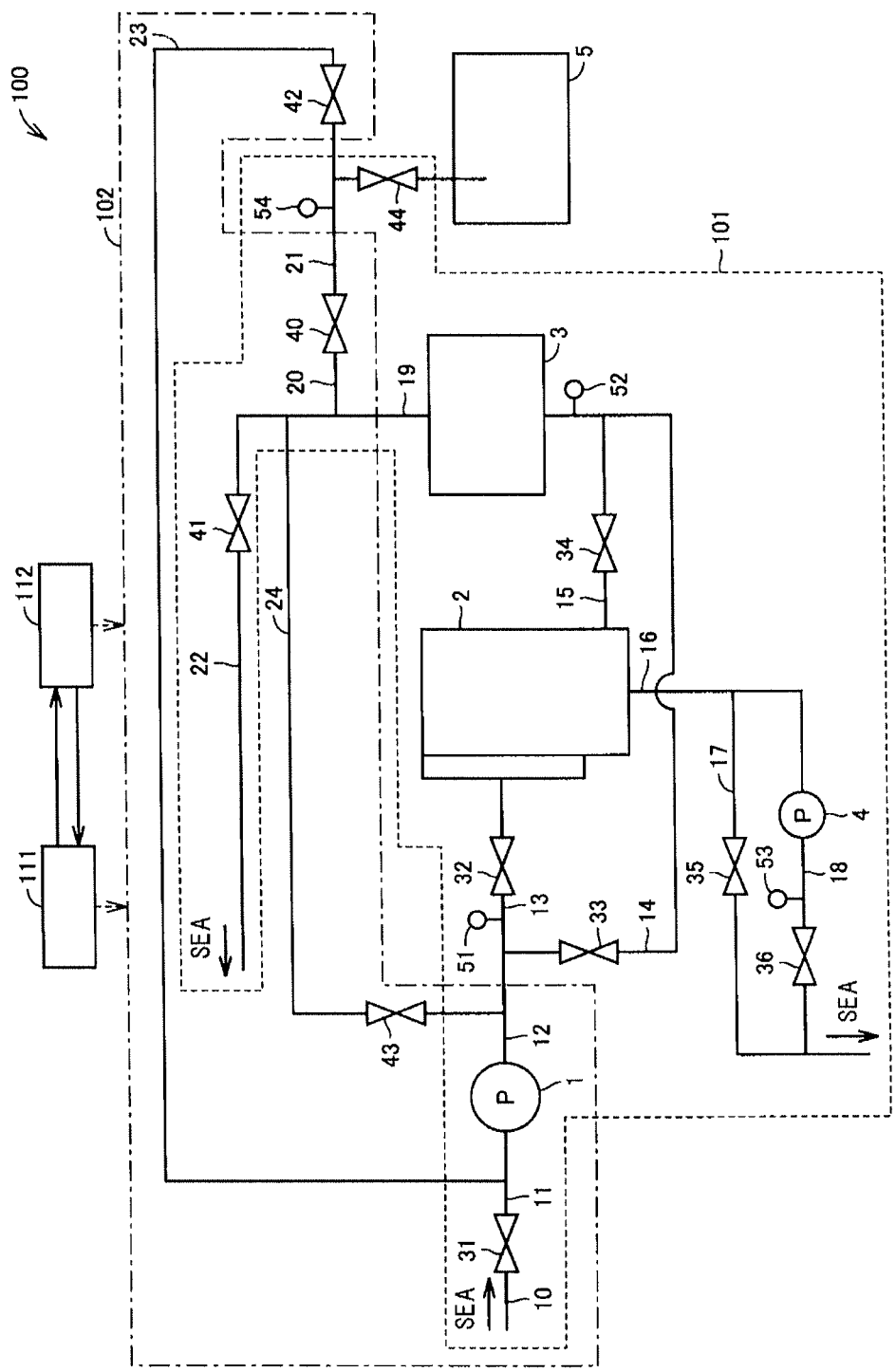
FIG. 1 is an overall diagram of a ballast water management system according to an embodiment of the present invention.

REFERENCE SIGNS LIST 1 ballast pump, 2 filtering device, 2A reverse cleaning device, 3 ultraviolet irradiation device, 4 drainage pump, 5 ballast tank, 10 to 27 line, 27 pressurizing pipe, 31 to 36, 40 to 44 valve, 51, 52, 53, 54 flow meter, 61 filter, 62 untreated water nozzle, 63, 141 case, 64 filtered water flow path, 65 discharge flow path, 66 untreated water flow path, 67 nozzle opening, 68 cleaning water tank, 70 chemical inlet, 71 outer cylindrical portion, 72 lid portion, 73 bottom portion, 80 central pipe, 81 intake hole, 90 motor, 91 motor cover, 100 ballast water management system, 101 ballast water treatment apparatus, 102 bypass system, 111, 112 control device, 121, 131 display panel, 122 bypass lamp, 123 BWMS enable lamp, 124, 132 operation mode switch, 125 processing mode switch, 126, 133 BWMS preparation lamp, 127 BWMS start button, 128 BWMS stop button, 129, 135 emergency stop button, 134 start button, 142 UV lamp, 143 lamp power supply, 144a to 144c illuminance sensor, C axis line, L1 straight line, L2 curved line.

DESCRIPTION OF EMBODIMENTS

A ballast water treatment apparatus according to an aspect of the present invention includes a filtering device including a filter for filtering seawater, an ultraviolet irradiation device that irradiates the seawater filtered by the filter with ultraviolet light, a first path for supplying the seawater filtered by the filtering device to the ultraviolet irradiation device, a discharge water path for discharging the seawater remaining in the filtering device, a first valve provided in the first path, a second path for supplying the seawater flowing from the ultraviolet irradiation device to a ballast tank, and a control device. The control device closes the first valve and cleans the filter by using the seawater introduced into the filtering device before the seawater filtered by the filtering device is supplied to the ultraviolet irradiation device.

According to this configuration, it is possible to enhance the performance of a purification treatment of ballast water during ballast water uptake. During the purification treatment of ballast water, filtration of seawater by the filtering device and ultraviolet irradiation of the seawater by the ultraviolet irradiation device are performed. By cleaning the filter of the filtering device prior to this purification treatment, it is possible to reduce the possibility of poor filtration performance of the filter at the time of starting the purification treatment. Accordingly, the performance of a purification treatment of ballast water can be enhanced.

Preferably, the ballast water treatment apparatus further includes a third path for discharging the seawater flowing from the ultraviolet irradiation device outside the ultraviolet irradiation device, the third path being branched from the second path, a second valve provided in the second path, and a third valve provided in the third path. The ultraviolet irradiation device includes an ultraviolet lamp disposed in a path through which the seawater passes. During a switching-on process of the ultraviolet lamp, the control device sets the first valve and the third valve to an open state and sets the second valve to a closed state. When the switching on of the ultraviolet lamp is completed, the control device sets the second valve to an open state and sets the third valve to a closed state.

According to this configuration, cleaning of the filter of the filtering device is performed by the time when switching on of the ultraviolet lamp is completed. Accordingly, immediately after the switching-on process of the ultraviolet lamp is completed, treatment of seawater can be performed. Thus, a start-up time of the ballast water treatment apparatus can be shortened.

Preferably, in the switching-on process of the ultraviolet lamp, the control device controls an electric power supplied to the ultraviolet lamp such that an illuminance of the ultraviolet lamp becomes a maximum value, and when the illuminance of the ultraviolet lamp reaches the maximum value, the control device decreases the illuminance of the ultraviolet lamp to a target value.

According to this configuration, the time necessary for the switching-on process of the ultraviolet lamp can be shortened. Furthermore, after the illuminance of the ultraviolet lamp reaches a maximum value, the illuminance of the ultraviolet lamp is decreased, thus saving the power consumption of the ultraviolet lamp.

Preferably, after the ultraviolet lamp is switched off, the control device sets the second valve to a closed state and sets the third valve to an open state.

According to this configuration, after the ultraviolet lamp is switched off, the ultraviolet lamp can be cooled with seawater passing through the ultraviolet irradiation device.

Preferably, the ballast water treatment apparatus further includes a reverse cleaning device that supplies cleaning water to the filtering device through the first path.

According to this configuration, the effect of cleaning the filter can be further enhanced. Accordingly, the performance of a purification treatment of ballast water can be enhanced.

A ballast water management system according to another aspect of the present invention includes the above ballast water treatment apparatus, a pump for supplying the seawater to the filtering device, and a ballast tank for storing the seawater supplied through the second path.

According to this configuration, the performance of a purification treatment of ballast water can be enhanced. Thus, it is possible to prevent insufficiently treated ballast water from entering the tank.

Preferably, the ballast water management system further includes a bypass system for feeding seawater into the ballast tank and discharging seawater from the ballast tank while bypassing the ballast water treatment apparatus.

According to this configuration, for example, even in the case where treatment of seawater by the ballast water treatment apparatus is not necessary or even in the case where seawater cannot be treated by the ballast water treatment apparatus, seawater can be fed into or discharged from the ballast tank.

An embodiment of the present invention will now be described in detail with reference to the drawings. In the drawings, the same or corresponding components are assigned with the same reference numerals, and a description thereof is not repeated.

In the present embodiment, the term "ballast water" refers to seawater stored in a ballast tank. Accordingly, in this specification, in the case where ballast water is seawater, an expression "ballast water (seawater)" may be used.

In the present embodiment, the term "untreated water" refers to seawater that is treated by a ballast water treatment apparatus according to the present embodiment. As described below, in the present embodiment, the term "untreated water" covers not only seawater taken up from a seawater environment to the ballast water treatment apparatus but also "ballast water". In the case where the term "ballast water" and the term "untreated water" are not necessarily distinguished from each other, the term "seawater" may be used.

<Configuration of ballast water management system>

FIG. 1 is an overall diagram of a ballast water management system according to an embodiment of the present invention. Referring to FIG. 1, a ballast water management system 100 according to an embodiment of the present invention is installed in a ship (not shown). During unloading of cargo from the ship, the ballast water management system 100 takes up seawater from a seawater environment around the ship and stores the seawater as ballast water in a ballast tank 5. On the other hand, during loading of cargo into the ship, the ballast water management system 100 discharges the ballast water stored in the ballast tank 5 into a seawater environment around the ship. The ballast tank 5 may be separated into a plurality of sections.

The ballast water management system 100 includes a ballast water treatment apparatus 101, a bypass system 102, and control devices 111 and 112. The ballast water treatment apparatus 101 and the bypass system 102 are main components of the ballast water management system 100 and can be constituted as a ballast water management apparatus.

While taking up seawater from a seawater environment around the ship, the ballast water treatment apparatus 101 performs a purification treatment of the seawater. Furthermore, while discharging ballast water (seawater) from the ballast tank 5, the ballast water treatment apparatus 101 can perform a purification treatment of the ballast water stored in the ballast tank. In the present embodiment, the term "purification" covers removal, killing, and inactivation of microbes contained in seawater.

On the other hand, while taking up seawater from a seawater environment around the ship, the bypass system 102 can load the uptaken seawater into the ballast tank 5 while the seawater bypasses the ballast water treatment apparatus 101. Furthermore, while ballast water (seawater) is discharged from the ballast tank 5, the bypass system 102 can discharge the ballast water into the sea while the ballast water bypasses the ballast water treatment apparatus 101. Specifically, the bypass system 102 forms a path for feeding ballast water into the ballast tank 5 and discharging the ballast water from the ballast tank 5 while the ballast water bypasses the ballast water treatment apparatus 101. For example, even in the case where treatment of seawater by the ballast water treatment apparatus 101 is not necessary or even in the case where seawater cannot be treated by the ballast water treatment apparatus 101, seawater can be fed into or discharged from the ballast tank 5 through the bypass system 102.

The ballast water treatment apparatus 101 and the bypass system 102 share some of components. In the case where the bypass system 102 has been already installed in a ship, the ballast water management system 100 according to an embodiment of the present invention can be realized by adding the ballast water treatment apparatus 101. Accordingly, the ballast water management system 100 according to an embodiment of the present invention can be installed in the ship without significantly changing existing facilities.

The ballast water treatment apparatus 101 includes a ballast pump 1, a filtering device 2, an ultraviolet irradiation device 3, a drainage pump 4, lines 10 to 22 for passing seawater, valves 31 to 36, 40, 41, and 44, and flow meters 51, 52, 53, and 54. Each of the lines is realized by arranging a pipe.

The line 10 is a line for taking seawater from a seawater environment. The line 11 is a line for passing the seawater that flows into the ballast pump 1. The line 12 is a line for passing the seawater that flows from the ballast pump 1. The ballast pump 1 suctions seawater from the lines 10 and 11 and discharges the seawater to the line 12.

The line 12 is branched into the line 13 and the line 14. The line 13 is a line for introducing the seawater into the filtering device 2. The line 14 forms a path that joins to the line 15 while bypassing the filtering device 2. The valve 32 controls a flow rate of the seawater flowing through the line 13. The valve 33 controls a flow rate of the seawater flowing through the line 14.

The filtering device 2 filters seawater that flows in the filtering device 2 through the line 13. The filtered seawater flows from the filtering device 2 through the line 15. The line 15 guides the seawater filtered by the filtering device 2 to the ultraviolet irradiation device 3. That is, the line 15 forms a path for supplying the seawater filtered by the filtering device 2 to the ultraviolet irradiation device 3. The flow meter 52 measures a flow rate of the seawater flowing through the line 15.

On the other hand, seawater that has not been filtered by the filtering device 2 is discharged from the filtering device 2 through the line 16. The line 17 is branched from the line 16. The lines 16 to 18 form a discharge water path for discharging seawater remaining in the filtering device 2.

The line 17 is a line for discharging the seawater that flows from the line 16 to the sea. The valve 35 is provided in the line 17 and controls a flow rate of the seawater flowing through the line 17.

The line 16 is connected to an inlet of the drainage pump 4. The line 18 is a line for passing the seawater that flows from the drainage pump 4. The line 18 joins to the line 17.

The seawater discharged from the drainage pump 4 flows through the line 18 and is discharged into the sea. The valve 36 is provided in the line 18 and controls a flow rate of the seawater flowing through the line 18. The flow meter 53 measures a flow rate of the seawater flowing through the line 18.

The drainage pump 4 is smaller than the ballast pump 1. Specifically, a discharge capacity of the drainage pump 4 is lower than the discharge capacity of the ballast pump 1. By using a small pump as the drainage pump 4, a reduction in the size of the ballast water treatment apparatus 101 can be realized.

The ultraviolet irradiation device 3 includes an ultraviolet (UV) lamp (not shown). The seawater flowing through the line 15 is passed through the ultraviolet irradiation device 3. The seawater passing through the ultraviolet irradiation device 3 is irradiated with ultraviolet light emitted from the ultraviolet lamp. Untreated water is filtered by a filter 61 (refer to FIG. 4) and then irradiated with ultraviolet light in the ultraviolet irradiation device 3. Accordingly, even when a small UV lamp is used, an effect of killing microbes inhabiting in the filtered seawater can be obtained. By using a small UV lamp in the ultraviolet irradiation device 3, advantages such as a reduction in the size of the device and saving of power consumption can be obtained.

The line 19 is a line for passing the seawater that flows from the ultraviolet irradiation device 3. The line 20 is a line for branching, from the line 19, the seawater that flows from the ultraviolet irradiation device 3 and guiding the seawater to the ballast tank 5. The line 21 is connected to the line 20 through the valve 40. The line 21 is a line for pouring the seawater to the ballast tank 5. That is, the lines 19, 20, and 21 form a path for supplying the untreated water flowing from the ultraviolet irradiation device 3 to the ballast tank 5.

Note that the line 21 also functions as a line for discharging seawater from the ballast tank 5. A flow meter 54 measures a flow rate of seawater flowing through the line 21.

The line 22 is branched from the line 19 and forms a path for discharging the seawater that flows from the ultraviolet irradiation device 3 through the line 19 to the sea. The valve 41 is provided in the line 22 and controls a flow rate of the seawater flowing through the line 22.

Each of the valves 31, 32, 33, 35, 36, 40, and 41 is, for example, a proportional control valve. The opening degree of each of the valves is controlled by a signal input to the valve. The valve 34 is, for example, an on-off valve. The valve 34 switches the state thereof between an open state and a closed state in accordance with a signal input to the valve 34. The valve 34 may be a proportional control valve.

The bypass system 102 includes a ballast pump 1, lines 10 to 12 and 20 to 24, and valves 31, and 40 to 43. As in the ballast water treatment apparatus, each of the lines is realized by arranging a pipe. The ballast pump 1, the lines 10, 11, 12, 20, and 21, and the valves 31 and 40 are components common to the ballast water treatment apparatus 101 and the bypass system 102. Therefore, a detailed description of these components is not repeated below.

The line 23 is connected to the line 21 through the valve 42. The valve 42 controls a flow rate of seawater flowing through the line 23.

The line 24 is branched from the line 19 and connected to the line 12. The valve 43 is provided in the line 24 and controls a flow rate of seawater flowing through the line 24.

Each of the valves 42 and 43 is, for example, a proportional control valve. The opening degree of each of the valves is changed in accordance with the magnitude of an input signal.

The ballast water management system 100 further includes the control devices 111 and 112. The control devices 111 and 112 can be operated by an operator (not shown). An operation of a control device by an operator corresponds to an input of an instruction to the control device by the operator.

The control devices 111 and 112 receive an instruction from an operator and control the ballast water management system 100 in accordance with the instruction. That is, the control devices 111 and 112 also function as setting devices for setting an operation mode of the ballast water management system. Specifically, the control devices 111 and 112 control driving and stopping of the ballast pump 1 and the drainage pump 4. Furthermore, the control devices 111 and 112 control the open/close or the opening degree of each of the valves shown in FIG. 1. Furthermore, the control devices 111 and 112 control switching on and switching off of an UV lamp (not shown) included in the ultraviolet irradiation device 3.

The control devices 111 and 112 each have a communication function. The control device 111 can grasp its setting and transmit information relating to the setting to the control device 112. Similarly, the control device 112 can grasp its setting and transmit information relating to the setting to the control device 111. Accordingly, the control device 111 and the control device 112 can be installed in separate places.

For example, the control device 111 is installed near the ballast water treatment apparatus 101. On the other hand, the control device 112 is installed in, for example, a bridge. In accordance with this arrangement of the control devices 111 and 112, an operator can perform remote control of the ballast water management apparatus (ballast water treatment apparatus 101 and the bypass system 102) by using the control device 112 in the bridge.

The operator can control the operation and stop of the ballast water management system 100 by operating any one of the control devices 111 and 112. Furthermore, by operating any one of the control devices 111 and 112, the operator can switch the operation mode of the ballast water management system 100 between a ballast water treatment mode (referred to as "BWMS" (ballast water management system) mode in the present embodiment) and a bypass ("BYPASS") mode. The ballast water treatment mode is a mode in which the ballast water treatment apparatus 101 is operated. The bypass mode is a mode in which the bypass system 102 is operated while the ballast water treatment apparatus 101 is stopped.

Furthermore, in the case where the operation mode of the ballast water management system 100 is the BWMS mode, the operator can switch a processing mode by operating any one of the control devices 111 and 112. In the present embodiment, the processing mode includes a "Manual mode", a "Ballast mode", and a "De-Ballast mode".

The "Manual mode" is a mode in which an operator specifies a particular valve in operating any of the control devices 111 and 112, and specifies the open/close or the opening degree of the valve. The "Ballast mode" is a mode in which the ballast water management system 100 performs a process including taking up seawater from the sea, treating the seawater, and pouring the treated seawater into the ballast tank 5. The "De-Ballast mode" is a mode in which the ballast water management system 100 performs a process of discharging ballast water (seawater) stored in the ballast tank 5 to the sea. In the "Ballast mode" and the "De-Ballast mode", each of the valves is automatically controlled by the control device 111 or 112.

Figure 2:
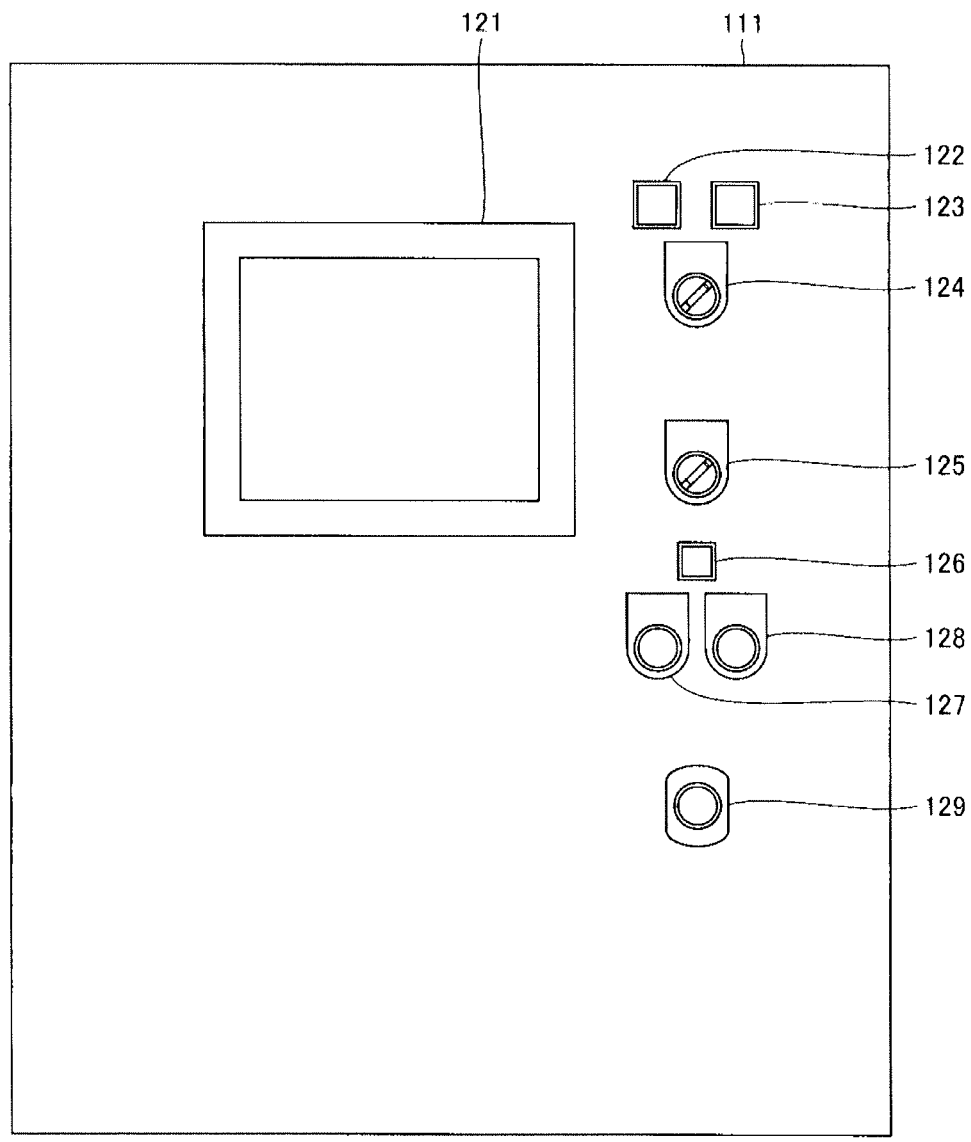
FIG. 2 is a schematic view showing a structural example of a control panel on the main body side of a ballast water treatment apparatus.

In an embodiment, the control devices 111 and 112 are realized as control panels. FIG. 2 is a schematic view showing a structural example of a control panel on the main body side of a ballast water treatment apparatus. Referring to FIG. 2, a control device 111 (control panel) includes a display panel 121, a bypass lamp 122, a BWMS enable lamp 123, an operation mode switch 124, a processing mode switch 125, a BWMS preparation lamp 126, a BWMS start button 127, a BWMS stop button 128, and an emergency stop button 129.

The display panel 121 displays, for example, an operation state of the ballast water management system 100. In an embodiment, the display panel 121 has a function of a touch panel. With this structure, an operator can input various types of setting to the control device 111 by touching the display panel 121 (touch panel).

The bypass lamp 122 is a lamp for indicating that the operation mode of the ballast water management system 100 is in the BYPASS mode. When the operation mode of the ballast water management system 100 is in the BYPASS mode, the bypass lamp 122 switches on. On the other hand, when the operation mode of the ballast water management system 100 is in the BWMS mode or when the setting of the operation mode of the ballast water management system 100 differs between the control device 111 and the control device 112, the bypass lamp 122 switches off.

The BWMS enable lamp 123 is a lamp for indicating a state in which the ballast water treatment apparatus 101 can be used. The "state in which the ballast water treatment apparatus 101 can be used" refers to a state in which, in both the control device 111 and the control device 112, the operation mode of the ballast water management system 100 is set to the BWMS mode. In this case, the BWMS enable lamp 123 switches on.

On the other hand, when the setting of the operation mode of the ballast water management system 100 differs between the control device 111 and the control device 112, the ballast water treatment apparatus 101 is in a state in which the ballast water treatment apparatus 101 cannot be used. In this case, the BWMS enable lamp 123 blinks. When the operation mode of the ballast water management system 100 is in the BYPASS mode, the BWMS enable lamp 123 switches off. In this manner, the BWMS enable lamp 123 varies its indication form through switched on, blinking, and switched off. Thus, the operator can easily see whether or not the setting of the operation mode is the same between the control device 111 and the control device 112.

The operation mode switch 124 is a switch used by the operator to notify the control device 111 of the operation mode of the ballast water treatment apparatus 101. Specifically, the operation mode switch 124 is configured so that the operation mode of the ballast water treatment apparatus 101 can be switched between the BYPASS mode and the BWMS mode.

The processing mode switch 125 is a switch for instructing the processing mode of the ballast water treatment apparatus 101 to the control device 111 by the operator when the BWMS mode is selected. Specifically, the processing mode switch 125 is configured so that the processing mode of the ballast water treatment apparatus 101 can be switched among the "Manual mode", the "Ballast mode", and the "De-Ballast mode".

The BWMS preparation lamp 126 blinks during start-up of the ballast water treatment apparatus 101. When the start-up of the ballast water treatment apparatus 101 is completed, the blinking rate of the BWMS preparation lamp 126 increases. The BWMS preparation lamp 126 becomes sufficiently bright so as to distinguish the state where the ballast water treatment apparatus 101 is under start-up from the state where the start-up of the ballast water treatment apparatus 101 is completed. Accordingly, the BWMS preparation lamp 126 may switch on during the start-up of the ballast water treatment apparatus 101, and the BWMS preparation lamp 126 may blink when the start-up of the ballast water treatment apparatus 101 is completed. The term "switched on" refers to a state in which light is continuously emitted. The term "blinking" refers to a state in which a light-emitting state and a non-light-emitting state are alternately repeated.

The BWMS start button 127 is an operation bottom used by the operator to instruct the control device 111 to start a purification treatment of seawater using the ballast water treatment apparatus 101. The BWMS stop button 128 is an operation bottom used by the operator to instruct the control device 111 to stop the purification treatment of seawater using the ballast water treatment apparatus 101. When the operator pushes the BWMS start button 127, the control device 111 receives an instruction of the start of the purification treatment of seawater. When the operator pushes the BWMS stop button 128, the control device 111 receives an instruction of the stop of the treatment of purifying seawater.

The emergency stop button 129 is an operation button for stopping the operation of the ballast water treatment apparatus 101 in case of emergency.

Figure 3:
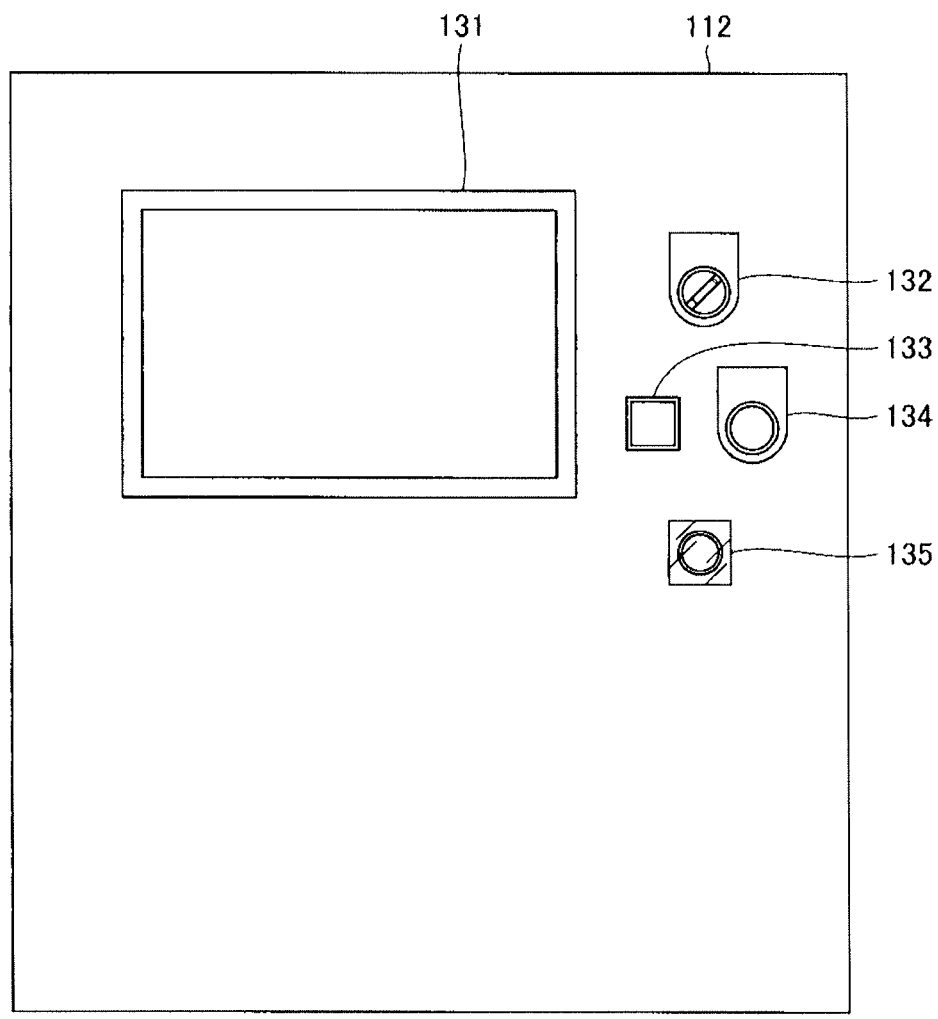
FIG. 3 is a schematic view showing a structural example of a control panel on the bridge side of a ship.

FIG. 3 is a schematic view showing a structural example of a control panel on the bridge side of a ship. Referring to FIG. 3, the control device 112 (control panel) includes a display panel 131, an operation mode switch 132, a BWMS preparation lamp 133, and a start button 134, and an emergency stop button 135.

The display panel 131 displays an operation state of the ballast water management system 100. For example, the display panel 131 displays an operation mode set by an operator.

As in the display panel 121 shown in FIG. 2, in an embodiment, the display panel 131 may have a function of a touch panel. With this structure, the function possessed by the control device 111 shown in FIG. 2 can be realized by the display panel 131 (touch panel). For example, in the case where the operation mode is set to the BWMS mode, the operator can select the processing mode and notify the control device 112 of the selected processing mode by touching the display panel 131 (touch panel). In this case, the display panel 131 can display the selected processing mode.

Similarly to the operation mode switch 124 shown in FIG. 2, the operation mode switch 132 is a switch used by the operator to notify the control device 112 of the operation mode of the ballast water treatment apparatus 101. The operation mode switch 132 is configured so that the operation mode of the ballast water treatment apparatus 101 can be switched between the BYPASS mode and the BWMS mode.

The BWMS preparation lamp 133 performs the same operation as that of the BWMS preparation lamp 126 shown in FIG. 2. Specifically, the BWMS preparation lamp 133 blinks during start-up of the ballast water treatment apparatus 101. When the start-up of the ballast water treatment apparatus 101 is completed, the blinking rate of the BWMS preparation lamp 133 increases.

The start button 134 is an operation button used by the operator to notify the control device 112 of the operation of the ballast water management system 100 in a selected operation mode. The emergency stop button 135 is an operation button for stopping the operation of the ballast water treatment apparatus 101 in case of emergency.

As shown in FIGS. 2 and 3, the control device 111 and the control device 112 have different structures. However, the structures of the control devices 111 and 112 are not limited thereto. The control device 111 and the control device 112 may have the same structure. In the description below, it is assumed that the display panels 121 and 131 are touch panels and can receive the operation of an operator.

<Structure of Ballast Water Treatment Apparatus>

Figure 4:
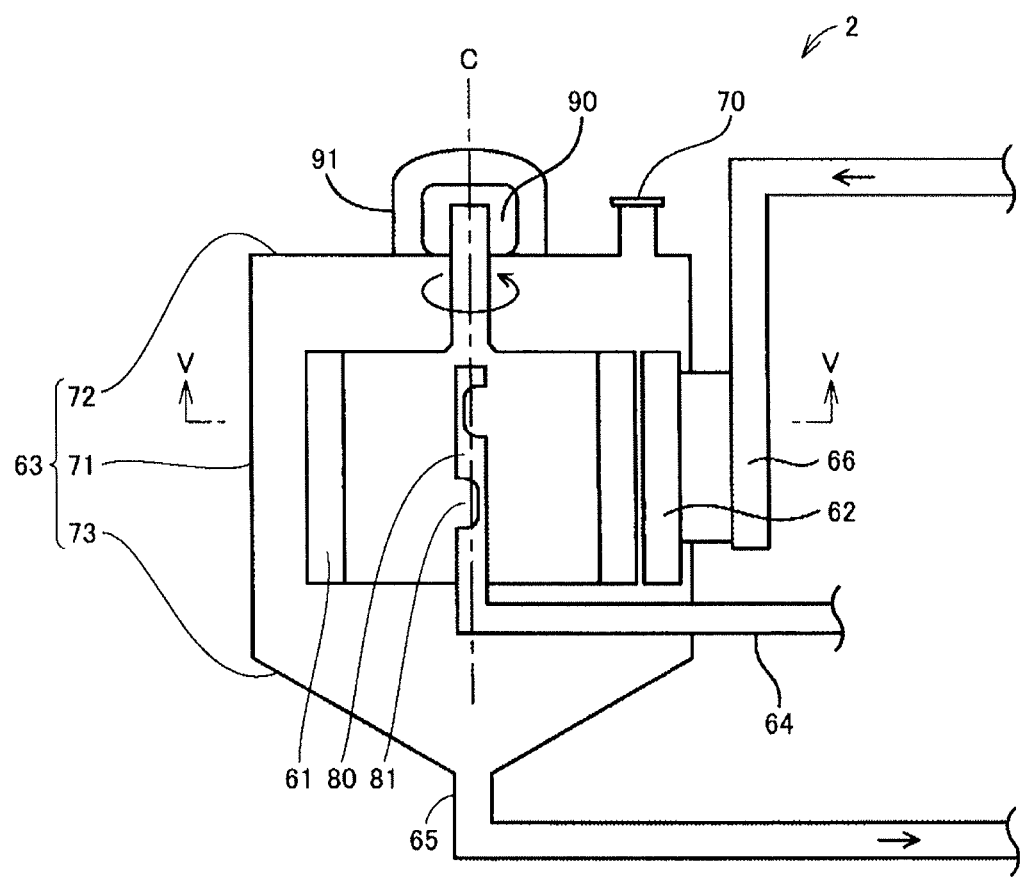
FIG. 4 is a view illustrating a structural example of a filtering device shown in FIG. 1.
Figure 5:
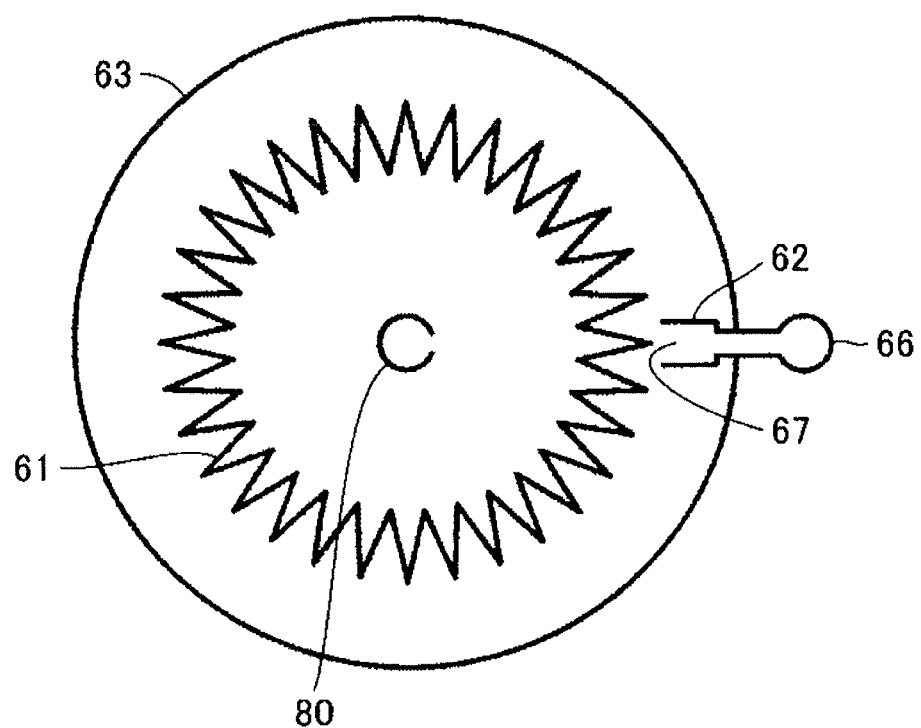
FIG. 5 is a cross-sectional view taken along line V-V of FIG. 4.

FIG. 4 is a view illustrating a structural example of the filtering device 2 shown in FIG. 1. FIG. 5 is a cross-sectional view taken along line V-V of FIG. 4.

Referring to FIGS. 4 and 5, seawater which is untreated water passes through a untreated water flow path 66 corresponding to the line 13 of FIG. 1 and is supplied to the inside of a case 63. A filter 61 having a cylindrical shape is provided in the case 63. An axis line C denotes a central axis of the filter 61 (cylinder). In other words, the filter 61 is arranged so as to surround the axis line C.

A motor 90 is connected to the central axis of the filter 61. When an electric power is supplied from a driving device (not shown), the motor 90 rotates the filter 61 around the axis line C as a center. The motor 90 is covered with a motor cover 91. The motor 90 is controlled by, for example, the control device 111.

An upper surface and a lower surface of the cylinder of the filter 61 are sealed in a watertight manner. A rotatable attachment structure also needs to have a watertight structure. However, the structure is not particularly limited and a known structure may be used.

The case 63 covers the whole of the filter 61. The case 63 includes an outer cylindrical portion 71, a lid portion 72, and a bottom portion 73. A discharge flow path 65 corresponding to the line 16 of FIG. 1 is provided in the bottom portion 73. The untreated water flow path 66 and an untreated water nozzle 62 are provided inside the case 63 in order to introduce seawater as the untreated water. A chemical inlet 70 is provided on the lid portion of the case 63. However, the chemical inlet need not necessarily be provided in the case 63.

The untreated water nozzle 62 is provided so as to extend from the untreated water flow path 66. A nozzle opening 67 is formed at an end of the untreated water nozzle 62. The nozzle opening 67 is arranged in the outer cylindrical portion 71 of the case 63. The nozzle opening 67 is formed so that the untreated water flows out from the nozzle opening 67 toward an outer circumferential surface of the filter 61.

A central pipe 80 is arranged on the axis line C. The central pipe 80 is connected to a filtered water flow path 64 corresponding to the line 15 of FIG. 1. Note that the central pipe 80 does not rotate.

Figure 6:
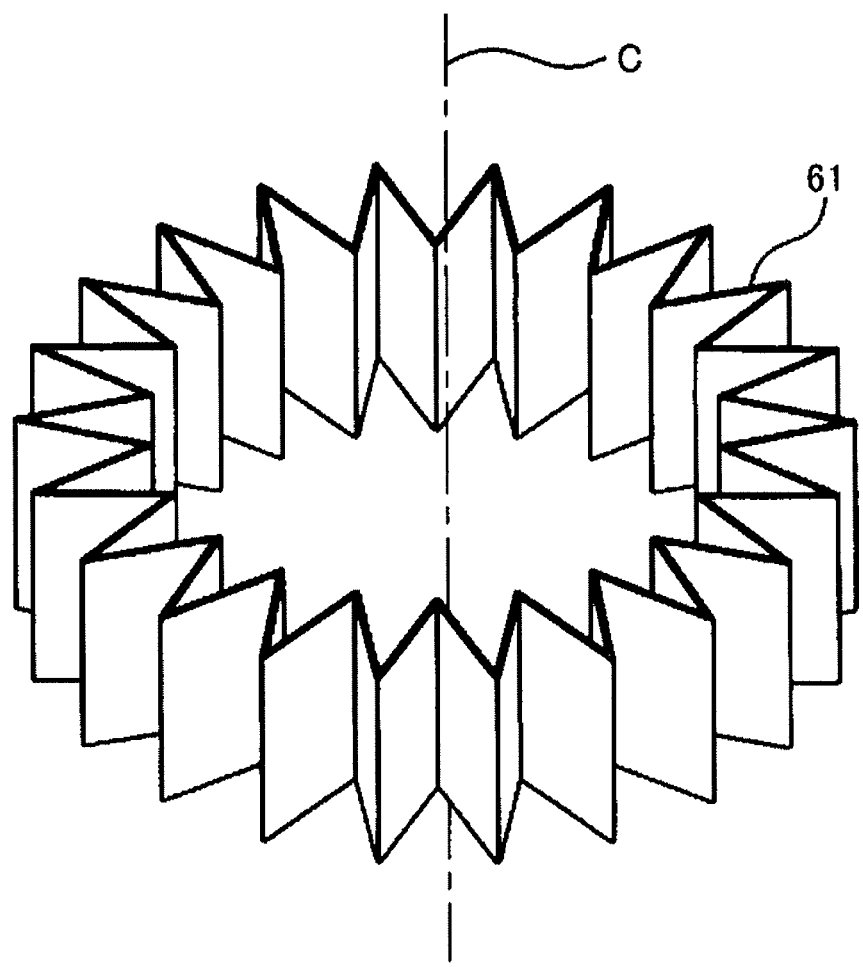
FIG. 6 is a schematic perspective view illustrating a typical structure of a filter shown in FIG. 4.

FIG. 6 is a schematic perspective view illustrating a typical structure of the filter 61 shown in FIG. 4. Referring to FIGS. 5 and 6, the filter 61 is a pleated filter. A so-called pleated shape is formed by folding a planar strip-shaped base so as to have alternating peaks and valleys. A cylindrical pleated filter is formed by connecting two ends of the pleated base to each other.

A porous resin sheet is used as the base of the filter. Examples of the material of the porous resin sheet that can be used include porous structures such as a stretched porous body, a porous body by phase separation, and a non-woven cloth that are composed of polyester, nylon, polyethylene, polypropylene, polyurethane, polytetrafluoroethylene (PTFE), polyvinylidene fluoride (PVdF), or the like. In order to perform a filtration treatment at a high flow rate, a non-woven cloth composed of a polyester such as polyethylene terephthalate is particularly suitably used.

Referring to FIGS. 4 and 5 again, untreated water passes through the untreated water flow path 66, and is ejected from the nozzle opening 67 of the untreated water nozzle 62. The untreated water ejected from the nozzle opening 67 is permeated from the outside of the cylinder of the filter 61 to the inside of the cylinder thereof. Accordingly, the untreated water is filtered. The untreated water filtered by permeating the filter 61 is guided to the filtered water flow path 64 through intake holes 81 provided in the central pipe 80, and allowed to flow to the outside of the filtering device 2.

On the other hand, untreated water that has not been filtered by the filter 61 and suspensoid precipitated on the bottom portion 73 of the case 63 are discharged outside the filtering device 2 through the discharge flow path 65. The filtration is performed while the suspensoid or the remaining untreated water is continuously discharged in this manner. With this structure, an amount of treatment (for example, 10 to 20 ton/h, and furthermore, 100 ton/h) which is required as an amount of treatment of ballast water can be ensured.

In the operation described above, suspensoid adheres to the outer circumferential surface of the filter 61. According to the structure shown in FIG. 4, the motor 90 rotates the filter 61. The untreated water ejected from the nozzle opening 67 comes in contact with the outer circumferential surface of the rotating filter 61. A stream of water is constantly generated on the outer circumferential surface of the filter 61 by a pressure of the untreated water and a rotating stream of water. In this case suspensoid adhering to the filter 61 is easily removed. That is, according to the present embodiment, in addition to the effect of filtering untreated water, a certain cleaning effect can also be obtained.

Figures 7, 8:
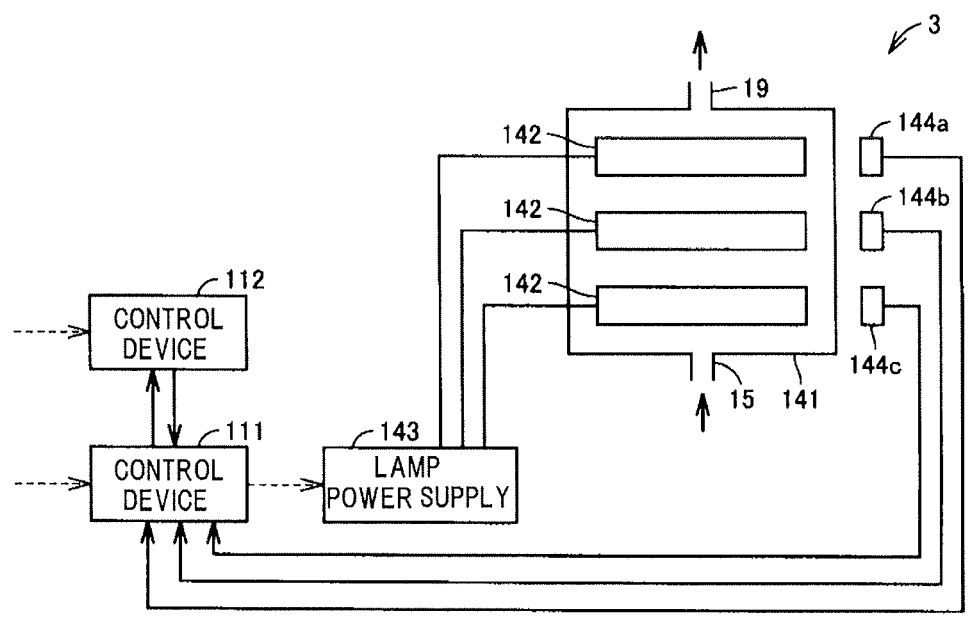
FIG. 7 is a diagram showing a structural example of an ultraviolet irradiation device shown in FIG. 1.
FIG. 8 is a table showing control contents determined by a combination of setting of a control device on the ballast water treatment apparatus side and setting of a control device on the bridge side.

FIG. 7 is a diagram showing a structural example of the ultraviolet irradiation device 3 shown in FIG. 1. Referring to FIG. 7, the ultraviolet irradiation device 3 includes a case 141, UV lamps 142, a lamp power supply 143, and illuminance sensors 144a, 144b, and 144c.

The case 141 is arranged between the line 15 and line 19. The case 141 houses the UV lamps 142. Untreated water passes inside the ultraviolet irradiation device 3 through the lines 15 and 19.

The untreated water passing through the inside of the case 141 is irradiated with ultraviolet light emitted from the UV lamps 142. As described above, switching on and switching off of the UV lamps 142 are controlled by the control device 111 or the control device 112.

The illuminance sensors 144a to 144c each measure an illuminance of ultraviolet light emitted from the corresponding UV lamp 142 and transmitted through the untreated water. The illuminance detected by each of the illuminance sensors is transmitted from the illuminance sensors to the control device 111. On the basis of the results detected by the illuminance sensors 144a to 144c, the control device 111 instructs the lamp power supply 143 on a ratio relative to a maximum electric power of the UV lamps 142. The lamp power supply 143 supplies each of the UV lamps 142 with an electric power corresponding to the instructed ratio.

<Control of Ballast Water Management System>

1. Setting of Operation Mode

As described above, for the purpose of setting an operation mode of the ballast water management system 100, an operator of the ballast water management system 100 can operate both the control device 111 and the control device 112. In the case where there is only a single device for setting (and monitoring) the ballast water management system 100, the operator must move to an installation place of the control device 111. In the case of a large structure such as a ship, the operator may need a large labor for moving to the installation place of the control device 111.

According to the present embodiment, the ballast water management system 100 includes a plurality of control devices used by an operator to set (and monitor) an operation mode of the ballast water management system 100. The plurality of control devices can be separately arranged in a ship. Accordingly, the operator can use a control device arranged near the operator. Thus, convenience of the operator can be enhanced.

On the other hand, since the operation mode of the ballast water management system 100 can be set by each of the control devices 111 and 112, the setting of the operation mode may differ between the control device 111 and the control device 112 at a certain time. More specifically, there may be a case where the setting of the operation mode switch 124 shown in FIG. 2 and the setting of the operation mode switch 132 shown in FIG. 3 differs from each other.

In the present embodiment, when the setting of an operation mode of the ballast water management system 100 in the control device 111 is the same as that in the control device 112, the ballast water management system 100 allows the operation in the operation mode. The ballast water management system 100 can operate in accordance with the set operation mode. In contrast, when the setting of an operation mode differs between the control device 111 and the control device 112, the ballast water management system 100 allows neither the operation in the operation mode set in the control device 111 nor the operation in the operation mode set in the control device 112.

In an embodiment, the control device 111 determines allowance and prohibition of the operation of the ballast water management system 100. More specifically, the control device 111 checks the setting of the operation mode of the ballast water management system 100 in the control device 111. The control device 111 further acquires, from the control device 112, information relating to the setting of the operation mode of the ballast water management system 100 in the control device 112. When the setting in the control device 112 is the same as that in the control device 111, the control device 111 allows the ballast water management system 100 to operate in the operation mode.

The ballast water management system 100 can be operated in a correct operation mode as a result of the control described above. The term "correct operation mode" refers to an operation mode intended by an operator. In other words, the above control can prevent the ballast water management system 100 from operating in an operation mode that is not intended by an operator.

Another control is conceivable in the case where the setting of the operation mode differs between the control device 111 and the control device 112. For example, it is assumed that the setting in the control device 111 constantly takes precedence over the setting in the control device 112. That is, when the setting differs between the control device 111 and the control device 112, the setting in the control device 111 is constantly determined to be correct.

However, in the case where the setting differs between the control device 111 and the control device 112 and the setting in the control device 112 differs from the setting intended by the operator, an incorrect operation mode (that is not intended by the operator) is set to the ballast water management system 100.

In the present embodiment, in the case where the setting of the operation mode in the control device 111 is the same as that in the control device 112, the ballast water management system 100 can operate in the operation mode. Accordingly, the operation of the ballast water management system 100 in an incorrect operation mode can be prevented.

Furthermore, in the case where the ballast water management system 100 does not operate even though an operator sets the operation mode of the ballast water management system 100 by using one of the control devices 111 and 112 (for example, control device 111), the operator is able to see that a mode different from the operation mode intended by the operator is set in the other of the control devices 111 and 112 (for example, control device 112). In this case, for example, setting of the control device 112 can be corrected by instructing another operator present near the control device 112 to correct the setting of the operation mode of the control device 112.

Both the control device 111 and the control device 112 may determine the allowance and prohibition of the operation of the ballast water management system 100, and exchange the determination results. When the determination result of the control device 111 is the same as the determination result of the control device 112, one of the control devices 111 and 112 (for example, control device 111) allows or prohibits the operation of the ballast water management system 100 in accordance with the determination results. Also in this case, it is possible to prevent the ballast water management system 100 from operating in an operation mode that is not intended by the operator.

FIG. 8 is a table showing control contents determined by a combination of setting of the control device 111 on the ballast water treatment apparatus 101 side and setting of the control device 112 on the bridge side.

Referring to FIG. 8, the term "apparatus main body side" refers to the control device 111 installed on the ballast water treatment apparatus 101 side. The term "bridge side" refers to the control device 112 installed on the bridge side.

In the case where both the operation mode switch 124 of the control device 111 and the operation mode switch 132 of the control device 112 are set to the BWMS mode, the BWMS enable lamp 123 of the control device 111 switches on. In this case, the ballast water treatment apparatus 101 can be used. Accordingly, the ballast water management system 100 allows the operation in the BWMS mode.

In the case where both the operation mode switch 124 of the control device 111 and the operation mode switch 132 of the control device 112 are set to the BYPASS mode, the bypass lamp 122 of the control device 111 switches on. In this case, the ballast water treatment apparatus 101 is in an unusable state. Accordingly, the ballast water management system 100 allows the operation in the BYPASS mode.

In the case where the one of the operation mode switch 124 of the control device 111 and the operation mode switch 132 of the control device 112 is set to the BWMS mode and the other is set to the BYPASS mode, the BWMS enable lamp 123 of the control device 111 blinks. In this case, neither the operation of the ballast water treatment apparatus 101 nor the operation of the bypass system 102 is allowed. The start-up of the ballast water management system 100 is also not allowed.

Figure 9:
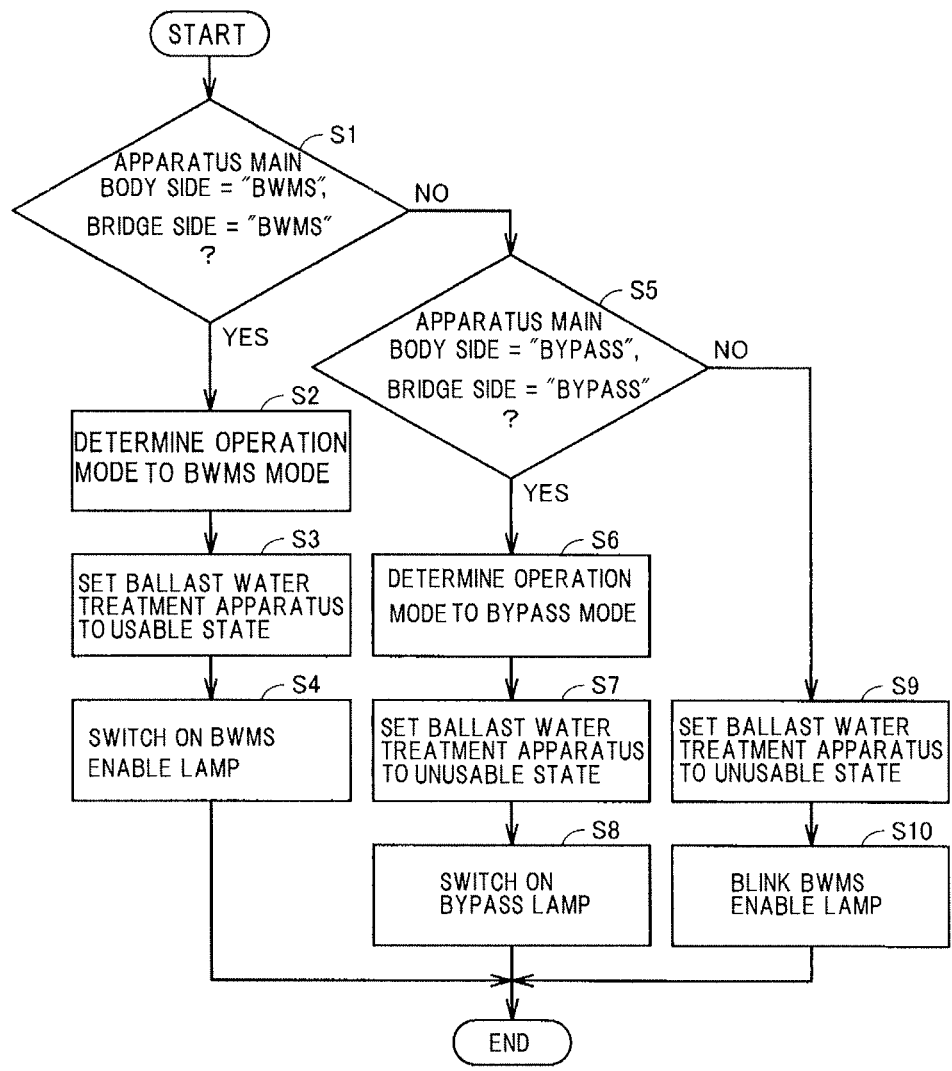
FIG. 9 is a flowchart showing a flow of the control shown in FIG. 8.

FIG. 9 is a flowchart showing a flow of the control shown in FIG. 8. In an embodiment, this control is performed by the control device 111. Referring to FIG. 9, in step S1, the control device 111 determines whether or not both the setting of the operation mode (operation mode switch 124, 132) of the control device (i.e., the control device 111) on "the apparatus main body side" and the setting of the operation mode of the control device (i.e., the control device 112) on "the bridge side" are each the BWMS mode.

In the case where both the setting in the control device 111 and the setting in the control device 112 are each the BWMS mode (YES in step S1), the process proceeds to step S2. In step S2, the control device 111 determines the operation mode of the ballast water management system 100 to the BWMS mode. Accordingly, the ballast water management system 100 allows an operation in the BWMS mode.

Next, in step S3, the control device 111 sets the ballast water treatment apparatus 101 to a usable state. Specifically, the control device 111 receives an operation of the control device 111 or the control device 112 by an operator. Accordingly, when the operator operates the processing mode switch 125, the ballast water treatment apparatus 101 can be operated in a processing mode set by the processing mode switch 125. In addition, treatment of untreated water by the ballast water treatment apparatus 101 can be started and stopped by operating the BWMS start button 127 and the BWMS stop button 128. Furthermore, in the control device 112, the treatment of untreated water by the ballast water treatment apparatus 101 can be started by operating the start button 134.

Subsequently, in step S4, the control device 111 switches on the BWMS enable lamp 123.

In contrast, in the case where the at least one of the operation mode of the control device 111 and the operation mode of the control device 112 is set to a mode different from the BWMS mode (NO in step S1), the process proceeds to step S5.

In step S5, the control device 111 determines whether or not both the setting of the operation mode of the ballast water management system 100 in the control device 111 (on the apparatus main body side) and the setting of the operation mode of the ballast water management system 100 in the control device 112 (on the bridge side) are each the BYPASS mode. In the case where both the setting of the control device 111 and the setting in the control device 112 are each the BYPASS mode (YES in step S5), the process proceeds to step S6.

In step S6, the control device 111 determines the operation mode of the ballast water management system 100 to the BYPASS mode. Accordingly, the ballast water management system 100 allows an operation in the BYPASS mode.

Next, in step S7, the control device 111 sets the ballast water treatment apparatus 101 to an unusable state. Specifically, the control device 111 invalidates the setting of the processing mode of the ballast water treatment apparatus 101 by the processing mode switch 125. In addition, operations of the BWMS start button 127 and the BWMS stop button 128 are invalidated. On the other hand, in the control device 112, the ballast water management system 100 can be operated in the BYPASS mode by operating the start button 134.

Subsequently, in step S8, the control device 111 switches on the bypass lamp 122.

In the case where both the setting of the operation mode in the control device 111 (on the apparatus main body side) and the setting of the operation mode in the control device 112 (on the bridge side) are neither the BWMS mode nor the BYPASS mode (NO in step S5), the process proceeds to step S9. In this case, in one of the control device 111 and the control device 112, the operation mode of the ballast water management system 100 is set to the BWMS mode, and, in the other control device, the operation mode of the ballast water management system 100 is set to the BYPASS mode. That is, the setting differs between the control device 111 and the control device 112.

In step S9, the control device 111 sets the ballast water treatment apparatus 101 to an unusable state. The process in step S9 is the same as the process in step S7, and thus a subsequent detailed description thereof is not repeated. Note that the bypass system 102 is also set to an unusable state. Accordingly, in the ballast water management system 100, neither the operation in the BWMS mode nor the operation in the BYPASS mode is allowed.

In step S10, the control device 111 blinks the BWMS enable lamp 123.

Figure 10:
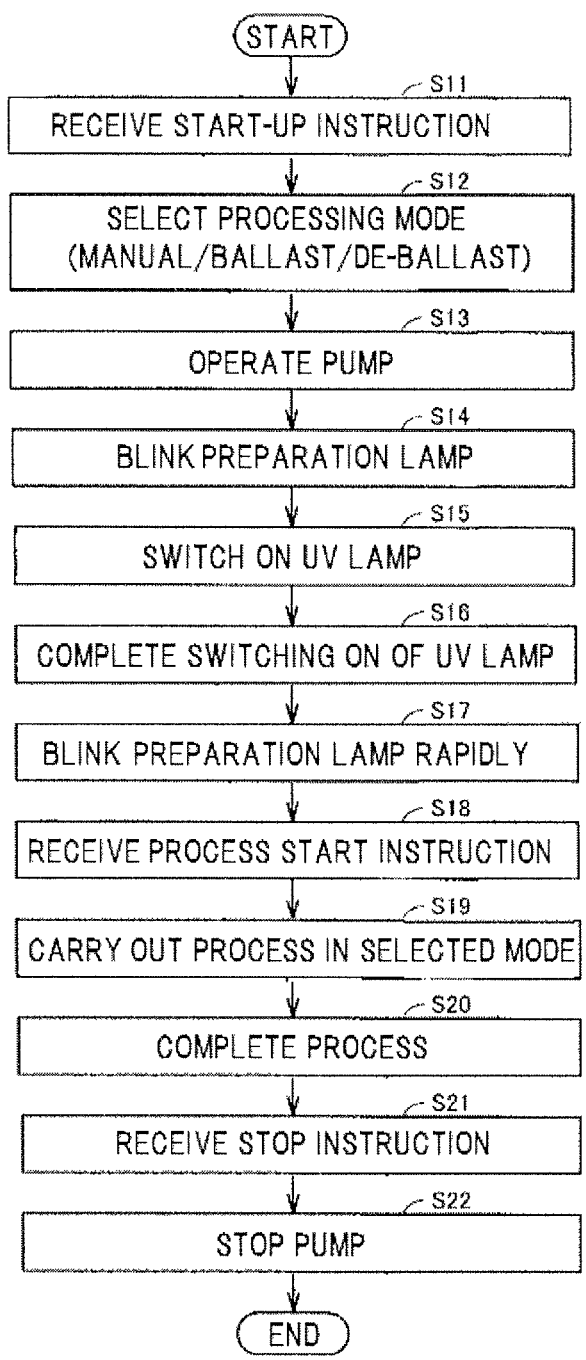
FIG. 10 is a flowchart explaining a flow of an operation of a ballast water treatment apparatus.

FIG. 10 is a flowchart explaining a flow of an operation of the ballast water treatment apparatus 101. Referring to FIG. 10, in step S11, the ballast water treatment apparatus 101 receives a start-up instruction. Specifically, the operator sets each of the operation mode of the control device 111 and the operation mode of the control device 112 to the BWMS mode. Consequently, the control device 111 receives a start-up instruction from the operator.

In step S12, the ballast water treatment apparatus 101 selects a processing mode. Specifically, the control device 111 selects a processing mode in accordance with the setting of the processing mode switch 125 by the operator. Accordingly, one processing mode is selected from the Manual mode, the Ballast mode, and the De-Ballast mode.

In step S13, the ballast water treatment apparatus 101 allows the ballast pump 1 to operate. This process is started by, for example, inputting an operation instruction of the ballast pump 1 to the control device 111 or 112 by the operator through an operation on the display panel 121 of the control device 111 or an operation on the display panel 131 of the control device 112.

In step S14, the control device 111 blinks the BWMS preparation lamp 126 (simply expressed by "preparation lamp" in FIG. 10).

In step S15, the control device 111 switches on the UV lamps 142 (refer to FIG. 7) of the ultraviolet irradiation device 3.

In step S16, switching on of the UV lamps 142 is completed. In step S17, the control device 111 blinks the BWMS preparation lamp 126 rapidly. That is, the blinking rate of the BWMS preparation lamp 126 increases.

In step S18, the control device 111 receives a process start instruction of the ballast water treatment apparatus 101. Specifically, when the operator pushes the BWMS start button 127 of the control device 111, the process start instruction is input to the control device 111. Alternatively, when the operator pushes the start button 134 of the control device 112, the process start instruction is input from the control device 112 to the control device 111.

In step S19, the ballast water treatment apparatus 101 carries out a process in the mode selected in the process of step S12. In step S20, the process is completed.

In step S21, the control device 111 receives a stop instruction of the ballast water treatment apparatus 101. Specifically, when the operator pushes the BWMS stop button 128 of the control device 111, the stop instruction is input to the control device 111. Alternatively, when the operator operates the display panel 131 of the control device 112, the stop instruction is input from the control device 112 to the control device 111. In step S22, the control device 111 stops the ballast pump 1.

2. Process in BWMS Mode (Ballast Mode)

Figure 11:
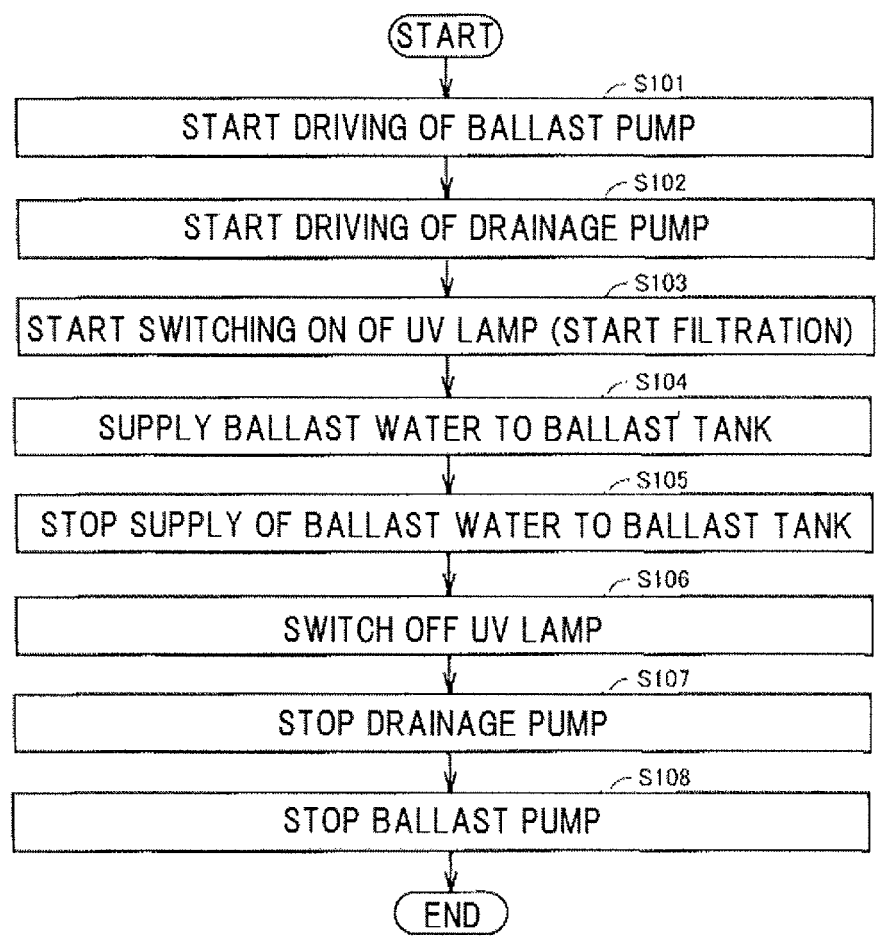
FIG. 11 is a flowchart explaining a process during ballast water uptake, according to an embodiment of the present invention.

FIG. 11 is a flowchart explaining a process during ballast water uptake, according to an embodiment of the present invention. An outline of the process of ballast water uptake will be described with reference to FIGS. 1 and 11. First, in step S101, the ballast water treatment apparatus 101 starts driving of the ballast pump 1. The ballast pump 1 takes up seawater as untreated water from the sea. The untreated water flows from the ballast pump 1 to the filtering device 2. In this case, cleaning of the filter 61 is performed in the filtering device 2 by using the untreated water (seawater). The untreated water after the cleaning of the filter 61 is returned to the sea.

In step S102, the ballast water treatment apparatus 101 starts driving of the drainage pump 4. In step S103, the ballast water treatment apparatus 101 starts switching on of the UV lamps 142 of the ultraviolet irradiation device 3. Furthermore, the filtering device 2 starts filtration of the untreated water. However, until the switching on of the UV lamps 142 is completed, the untreated water filtered in the filtering device 2 is returned to the sea without being sent to the ballast tank 5, though the untreated water passes through the ultraviolet irradiation device 3.

When the illuminance of each of the UV lamps 142 reaches a predetermined value, a switching-on process of the UV lamps 142 is completed. Subsequently, the process proceeds to step S104.

In step S104, the untreated water is supplied as ballast water to the ballast tank 5. That is, the untreated water flowing from the ultraviolet irradiation device 3 is sent to the ballast tank 5.

In step S105, the supply of ballast water to the ballast tank 5 is stopped. For example, an operator checks the water level of ballast water in the ballast tank 5, and performs an operation for stopping the supply of ballast water. This operation may be an operation of pushing the BWMS stop button 128 of the control device 111. Alternatively, the operator may operate the display panel 131 of the control device 112.

In step S106, the ballast water treatment apparatus 101 switches off the UV lamps 142 of the ultraviolet irradiation device 3. Untreated water filtered by the filtering device 2 passes through the ultraviolet irradiation device 3 and is returned to the sea. Next, the filtration of untreated water in the filtering device 2 is finished. In an embodiment, in this case, after the filtration of untreated water is finished, the filter 61 is cleaned in the filtering device 2 by using untreated water (seawater).

In step S107, the ballast water treatment apparatus 101 stops the drainage pump 4. In step S108, the ballast water treatment apparatus 101 stops the ballast pump 1. When the process in step S108 is finished, the whole process is finished.

Processes in the respective steps will now be described in detail. In the description below, it is assumed that the operator operates the control device 111. However, the same processes can be carried out by operation of switches, buttons, a display panel (touch panel), and the like of the control device 112 by the operator.

Figure 12:
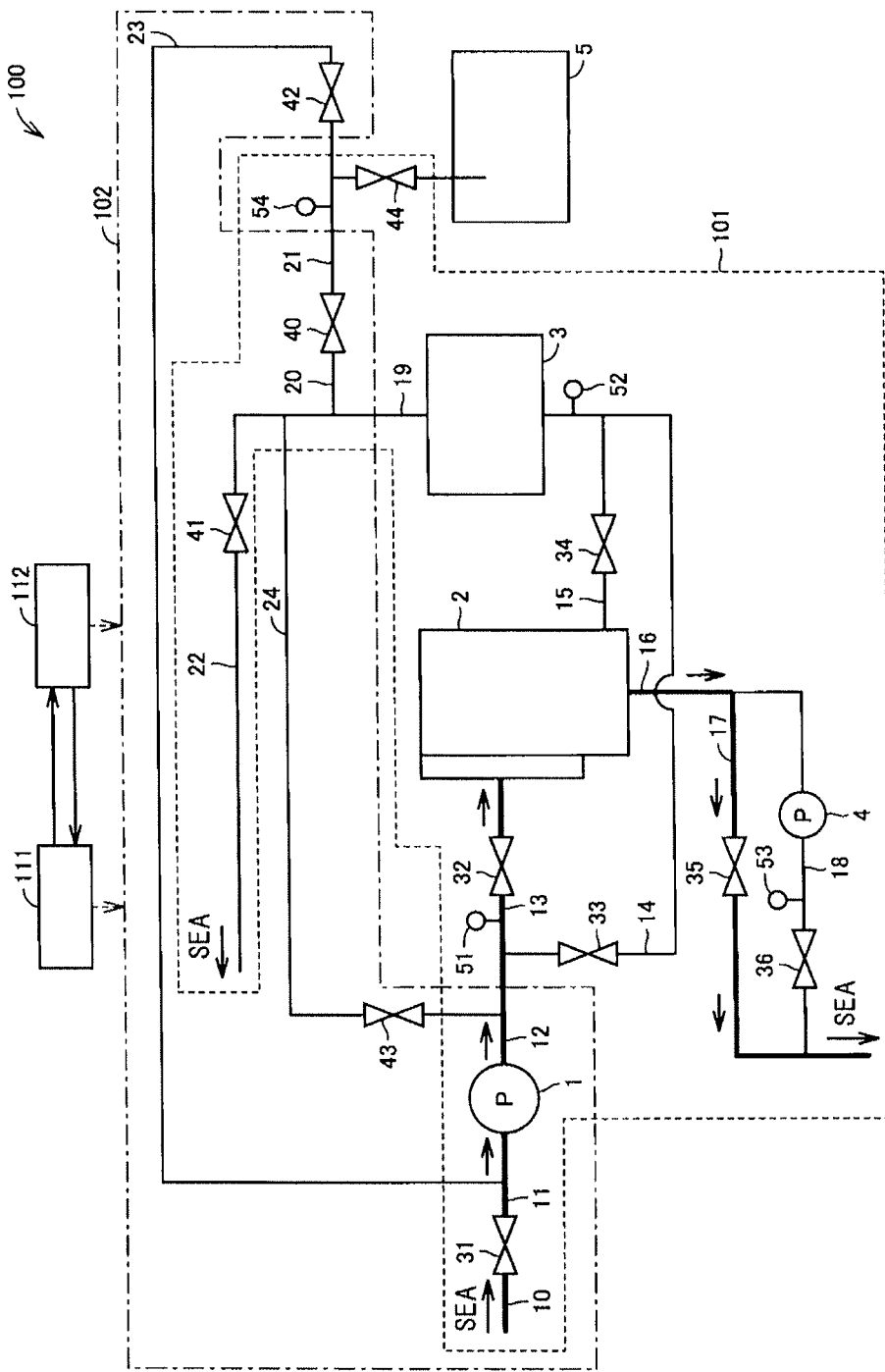
FIG. 12 is a diagram illustrating a process of step S101 of FIG. 11.

FIG. 12 is a diagram illustrating a process of step S101 of FIG. 11. Referring to FIG. 12, the control device 111 starts driving of the ballast pump 1. On the other hand, the drainage pump 4 remains stopped. The control device 111 sets the valves 31, 32, and 35 to an open state and sets the other valves to a closed state.

Untreated water is taken up from the sea by the ballast pump 1, and passes through the lines 10 and 11. The untreated water flows from the ballast pump 1 into the filtering device 2 through the lines 12 and 13. The untreated water is discharged from the filtering device 2 through the line 16. Note that since the valve 34 is closed, the untreated water does not flow from the filtering device 2 through the line 15.

The filtering device 2 cleans the filter 61 using the untreated water. As described with reference to FIG. 4 and FIG. 5, untreated water is ejected from the nozzle opening 67 while the filter 61 is rotated by the motor 90. Suspensoid adhering to the filter 61 is removed by a pressure of the untreated water and a rotating stream of water.

In the present embodiment, before seawater filtered by the filtering device 2 is supplied to the ultraviolet irradiation device 3, the filter 61 is cleaned by using seawater (untreated water) introduced into the filtering device 2 while the valve 34 is closed, as described above. Prior to the supply of ballast water to the ballast tank 5, the filter 61 is cleaned. Accordingly, a problem of a decrease in the performance of a treatment of ballast water can be prevented.

Furthermore, the untreated water is returned to the sea through the lines 16 and 17. Thus, pipes forming the lines 16 and 17 can also be cleaned.

Figure 13:
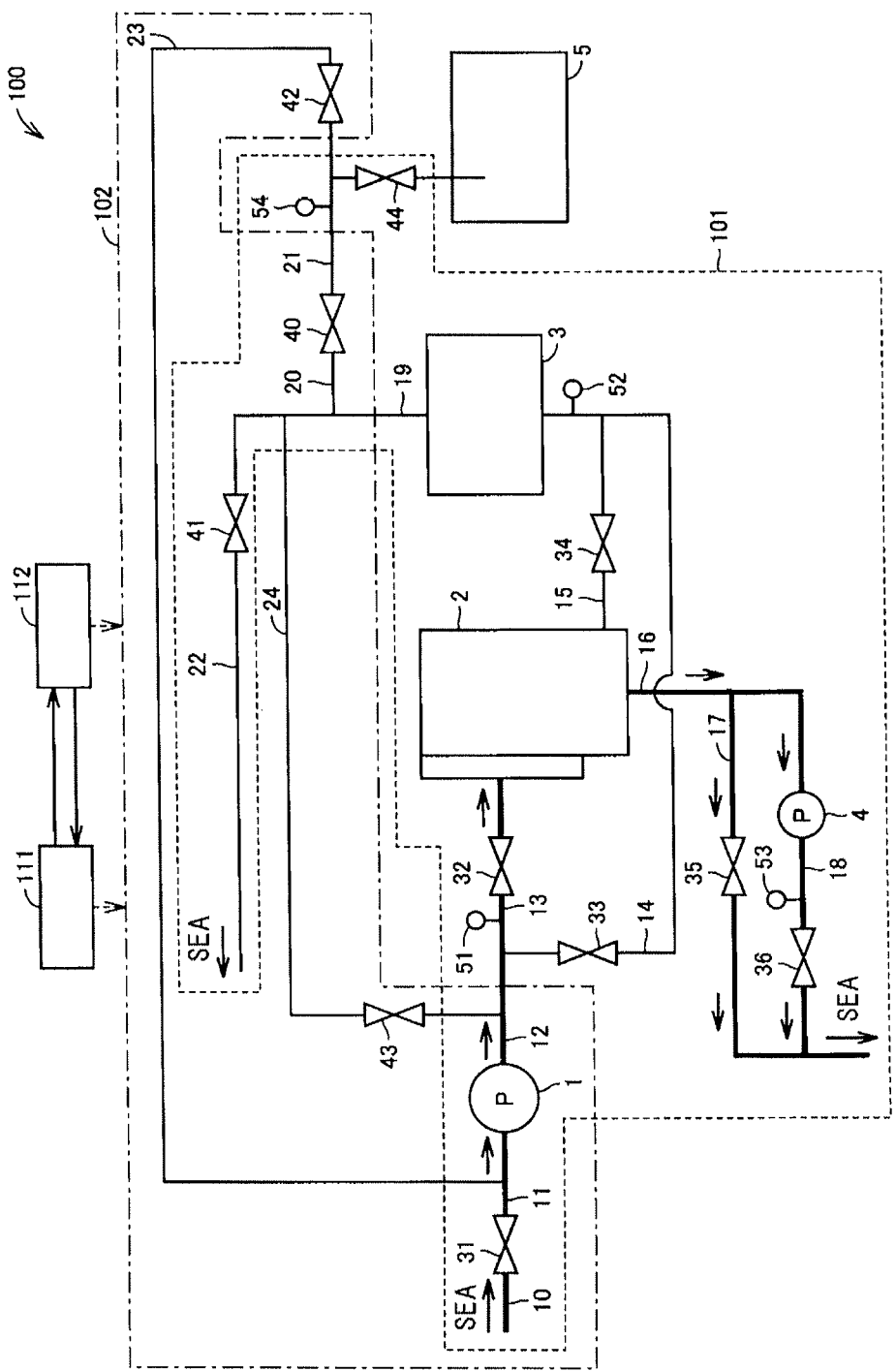
FIG. 13 is a diagram illustrating a process of step S102 of FIG. 11.

FIG. 13 is a diagram illustrating a process of step S102 of FIG. 11. Referring to FIG. 13, the control device 111 starts driving of the drainage pump 4. In the case where the processing mode is in the Ballast mode, the control device 111 can drive the drainage pump 4 automatically (for example, after the lapse of a certain time) subsequent to the driving of the ballast pump 1. On the other hand, in the case where the processing mode is in the Manual mode, the control device 111 drives the drainage pump 4 in response to an instruction input by the operator. The control device 111 further sets the valve 36 to an open state.

The control device 111 receives, from the flow meter 53, a signal representing a flow rate of untreated water flowing through the line 18. The control device 111 controls the opening degree of the valve 36 so that, for example, the flow rate of untreated water flowing through the line 18 becomes 20 m$^3$/h. This numerical value representing the flow rate is an example, and the flow rate of untreated water flowing through the line 18 is not limited thereto.

The untreated water discharged from the filtering device 2 is returned to the sea through the line 16 and lines 17 and 18. The drainage discharge of the drainage pump 4 is smaller than the discharge rate of the ballast pump 1. Accordingly, in order to discharge, to the sea, untreated water supplied from the ballast pump 1 to the filtering device 2, not only the line 18 but also the line 17 is used. The filter 61 is cleaned as in step S101.

Figure 14:
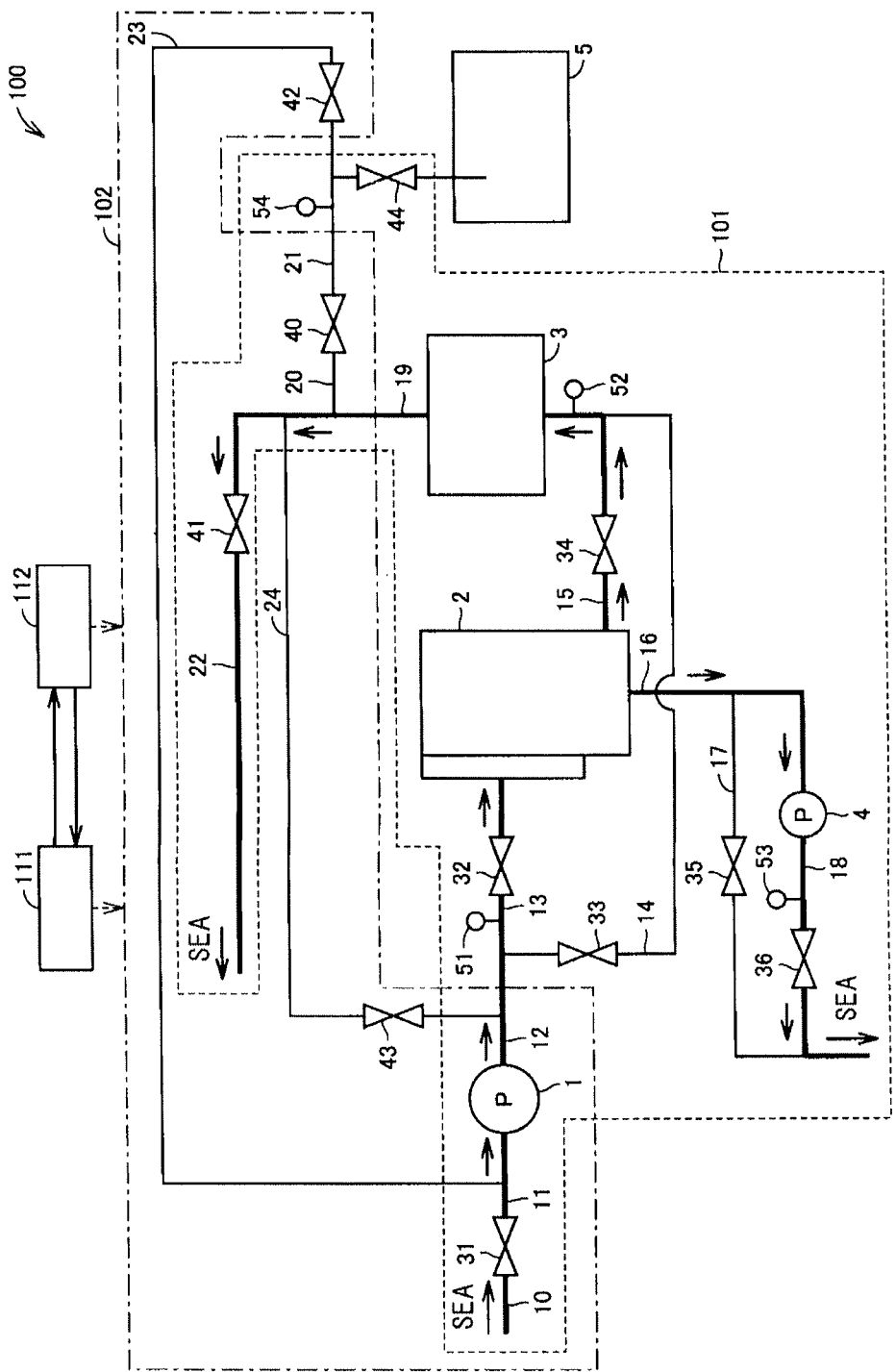
FIG. 14 is a diagram illustrating a process of step S103 of FIG. 11.

FIG. 14 is a diagram illustrating a process of step S103 of FIG. 11. Referring to FIG. 14, the control device 111 opens the valve 34 and closes the valve 35. Consequently, the untreated water filtered by the filtering device 2 is sent to the line 15. As described with reference to FIG. 4, the untreated water is filtered by permeating from an outer circumferential surface of the filter 61 to an inner circumferential surface of the filter 61. The filtered untreated water is guided to the filtered water flow path 64 through the intake holes 81 provided in the central pipe 80, and sent to the ultraviolet irradiation device 3 through the line 15.

Furthermore, the control device 111 starts switching on of the UV lamps 142 of the ultraviolet irradiation device 3. A certain period of time is required until the illuminance of the UV lamps 142 reaches a predetermined illuminance. Accordingly, the amount of irradiation of ultraviolet light applied to the untreated water may be insufficient to kill microbes or bacteria contained in the untreated water. Therefore, the control device 111 closes the valve 40 and opens the valve 41. The untreated water passing through the ultraviolet irradiation device 3 passes through the lines 19 and 22 and is returned to the sea. Thus, it is possible to prevent untreated water for which the amount of irradiation of ultraviolet light is insufficient (i.e., for which the effect of killing is insufficient) from being sent to the ballast tank 5.

In addition, the UV lamps 142 can be cooled by allowing the untreated water to pass through the ultraviolet irradiation device 3. Thus, it is possible to suppress overheating of the UV lamps 142 to which electricity is being supplied.

Figure 15:
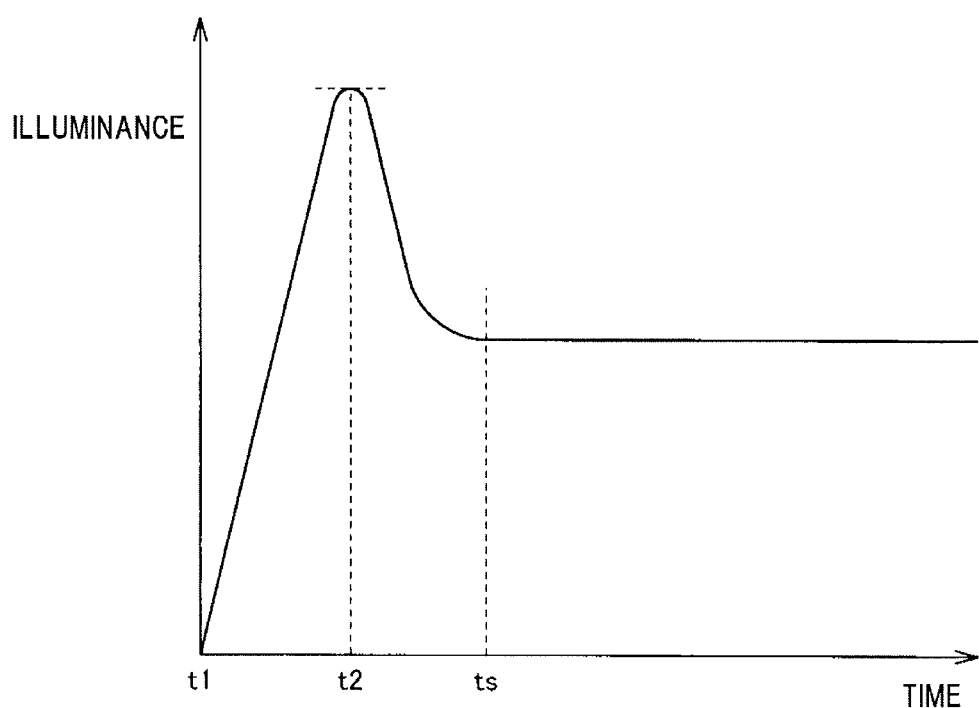
FIG. 15 is a graph illustrating a switching-on process of UV lamps during water uptake.

FIG. 15 is a graph illustrating a switching-on process of a UV lamp during water uptake. Referring to FIGS. 7 and 15, pumping of untreated water from a seawater environment to the ballast water treatment apparatus 101 is started at a time of t1. Immediately after the start of pumping of the untreated water, the amount of irradiation of ultraviolet light applied to the untreated water may be insufficient because, for example, air bubbles are contained in the untreated water. Therefore, the illuminance of ultraviolet light measured by each of the illuminance sensors 144a to 144c is low. The control device 111 controls an electric power supplied to each of the UV lamps 142 such that the illuminance of the UV lamp 142 becomes maximum. Specifically, the control device 111 sets a ratio of the electric power supplied to the UV lamp 142 to a maxim electric power of the UV lamp 142 to 100%. The control device 111 instructs the ratio (i.e., 100%) to the lamp power supply 143. This process can reduce the time required for the switching-on process of the UV lamps 142.

The electric power supplied to each of the UV lamps 142 reaches the maximum electric power at a time of t2. The control device 111 gradually decreases the electric power supplied to the UV lamp 142. Accordingly, the illuminance of the UV lamp 142 temporarily reaches a peak and then gradually decreases. At a time of ts, the illuminance detected by each of the illuminance sensors 144a to 144c reaches a target value. Thus, the switching-on process of the UV lamps 142 is completed.

After the time of ts, the control device 111 controls the lamp power supply 143 so that the illuminance of each of the UV lamps 142 is maintained at the target value. Preferably, the amount of electric power supplied to each of the UV lamps 142 is an amount of electric power predetermined so as to obtain a minimum illuminance necessary for killing microbes or bacteria in untreated water. Accordingly, the power consumption of the UV lamps 142 can be saved.

In this manner, the control device 111 controls the electric power supplied to each of the UV lamps 142 so that the illuminance of the UV lamp 142 becomes a maximum value. When the illuminance of the UV lamp reaches the maximum value, the control device 111 decreases the illuminance of the UV lamp 142 to the target value.

Figure 16:
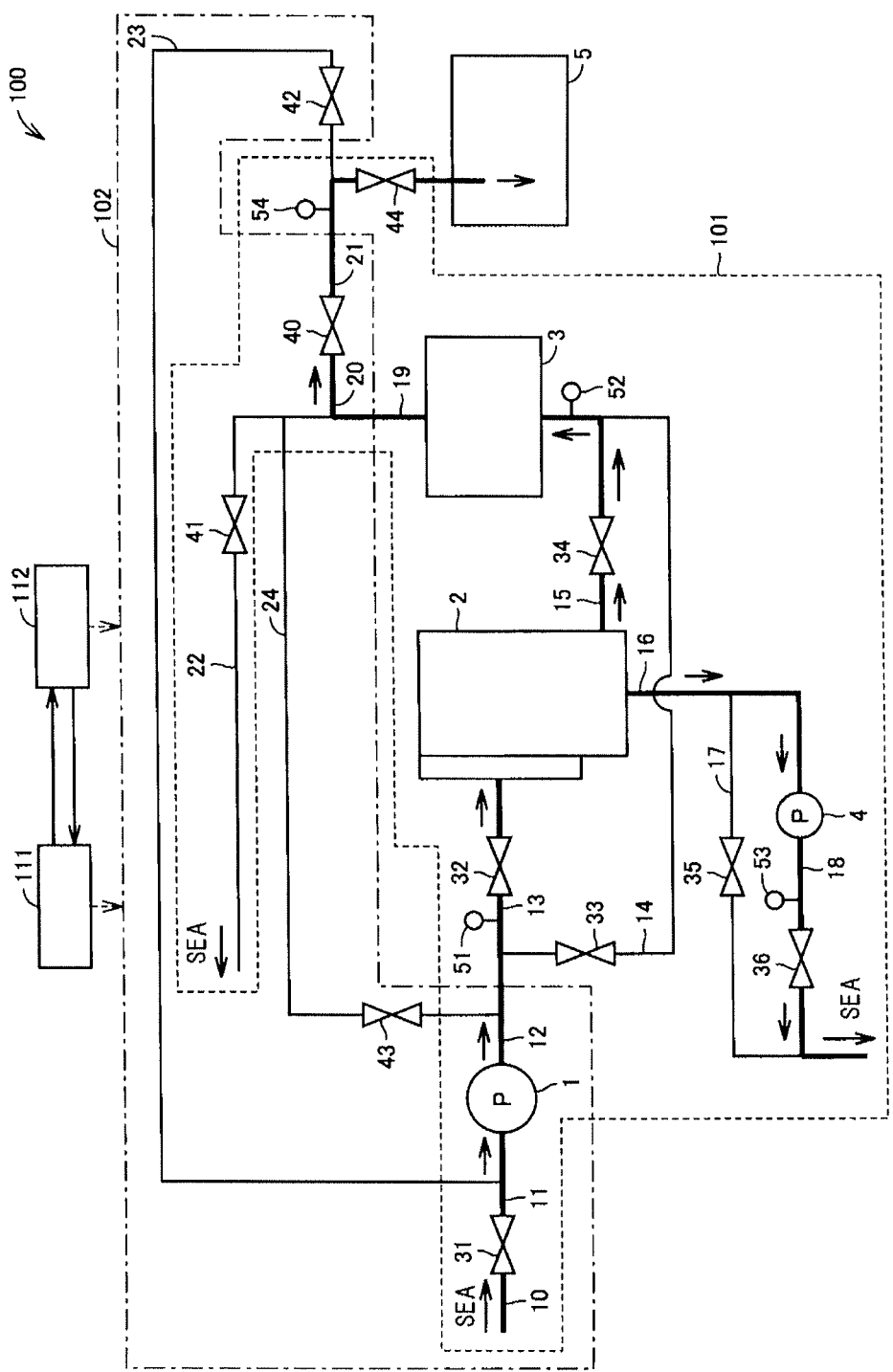
FIG. 16 is a diagram illustrating a process of step S104 of FIG. 11.

FIG. 16 is a diagram illustrating a process of step S104 of FIG. 11. Referring to FIG. 16, the control device 111 opens the valves 40 and 44, and closes the valve 41. The untreated water is filtered by the filtering device 2 and irradiated with ultraviolet light in the ultraviolet irradiation device 3. The untreated water that has been irradiated with ultraviolet light is stored as ballast water in the ballast tank 5.

The control device 111 determines the opening degree of the valves 40 and 44 on the basis of a flow rate shown by the flow meter 54. In this structure, the valve 32 is provided between the ballast pump 1 and the filtering device 2. Untreated water is discharged from the ballast pump 1 at a certain discharge pressure. However, after the untreated water passes through the valve 32, the pressure of the untreated water decreases. Some of the untreated water flowing in the filtering device 2 is suctioned by the drainage pump 4, thereby ensuring a flow rate of untreated water (ballast water) flowing through the line 15, the ultraviolet irradiation device 3, and the lines 20 and 21. That is, the performance of a treatment of ballast water can be ensured.

In addition, by cleaning the filter 61 of the filtering device 2 during the switching-on process of the UV lamps 142 or before the start of the switching-on process of the UV lamps 142, the treatment of unfiltered water can be performed immediately after the completion of the switching-on process of the UV lamps 142. Accordingly, a start-up time of the ballast water treatment apparatus 101 can be shortened.

Figure 17:
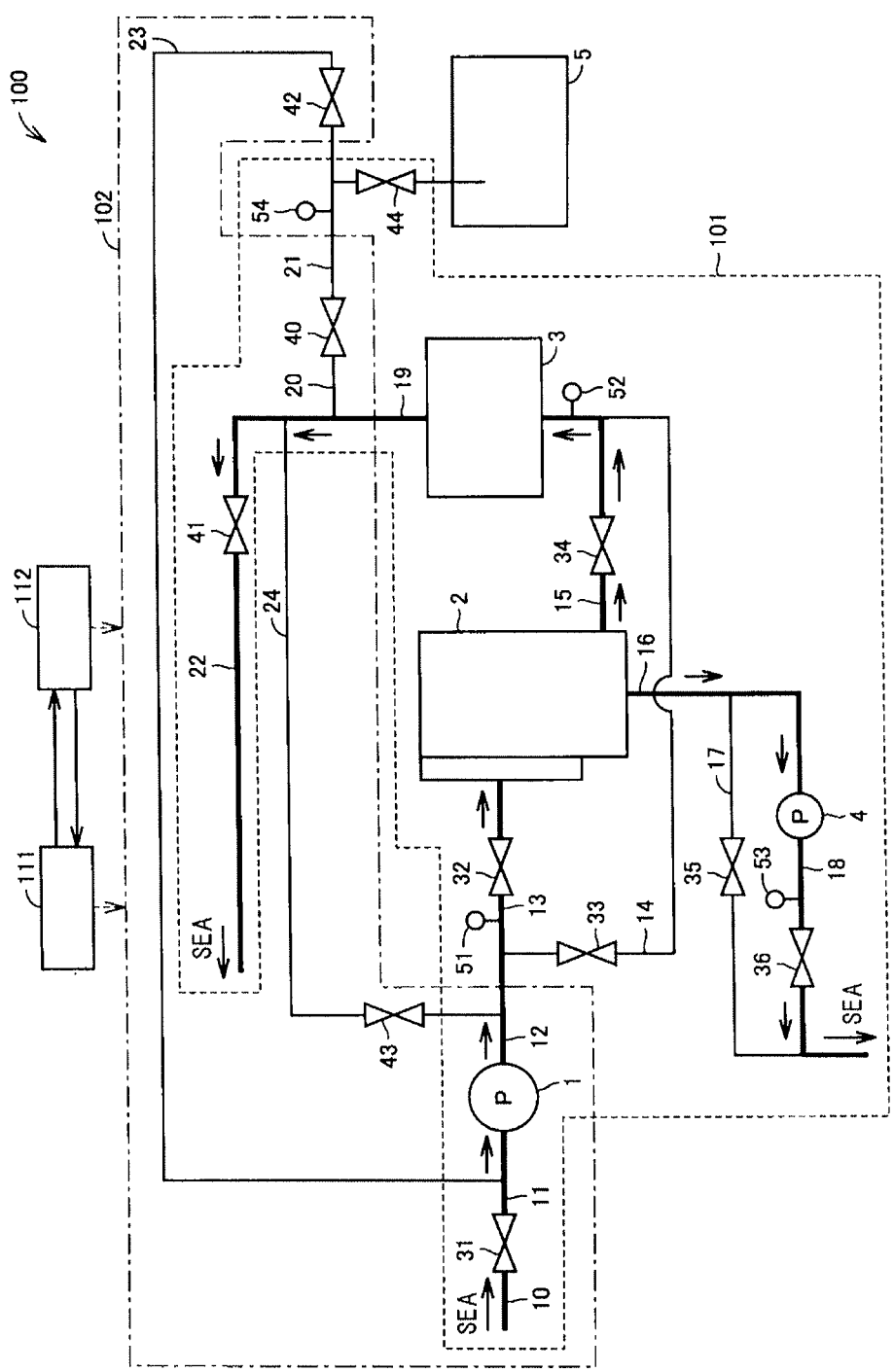
FIG. 17 is a diagram illustrating a process of steps S105 and S106 of FIG. 11.

FIG. 17 is a diagram illustrating a process of steps S105 and S106 of FIG. 11. Referring to FIG. 17, the supply of ballast water to the ballast tank 5 is stopped. For example, the operator checks the water level of the ballast tank 5 and pushes the BWMS stop button 128. Consequently, an instruction for stopping the supply of ballast water is sent to the control device 111. In response to this instruction, the control device 111 closes the valves 40 and 44 and opens the valve 41. Consequently, as in the process of step S104 (refer to FIG. 14), the untreated water passing through the ultraviolet irradiation device 3 passes through the line 22 and is returned to the sea. Furthermore, the control device 111 switches off the UV lamps 142 of the ultraviolet irradiation device 3. Also after the UV lamps 142 are switched off, untreated water is still allowed to pass through the ultraviolet irradiation device 3. Thus, the effect of cooling the UV lamps 142 can be obtained.

Figure 18:
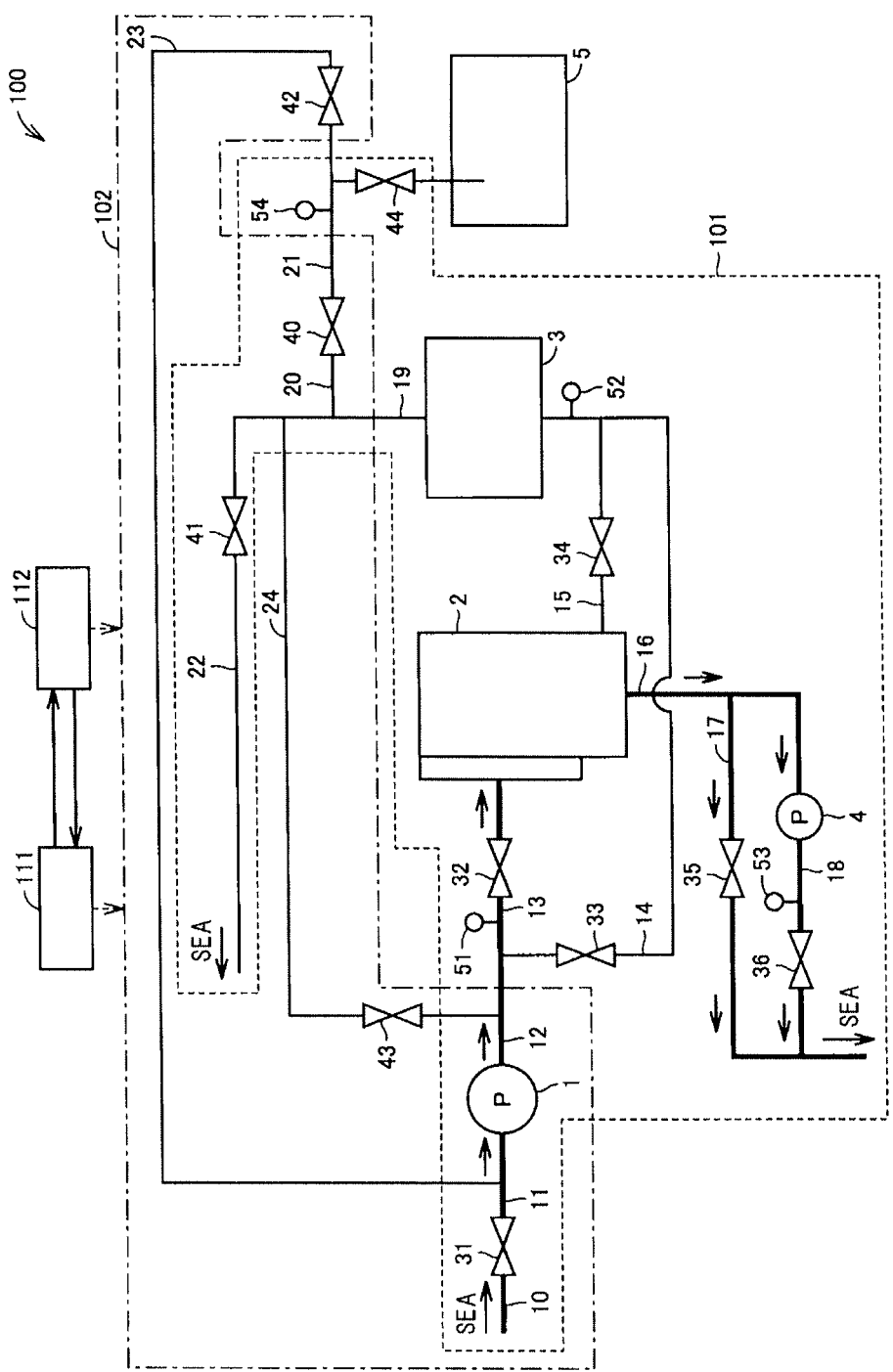
FIG. 18 is a diagram illustrating a part of a process of step S107 of FIG. 11.

FIG. 18 is a diagram illustrating a part of a process of step S107 of FIG. 11. Referring to FIG. 18, the control device 111 closes the valve 34 and opens the valve 35. Consequently, as in the process of step S102 (refer to FIG. 13), the untreated water flowing in the filtering device 2 is returned to the sea without being sent to the ultraviolet irradiation device 3.

Figure 19:
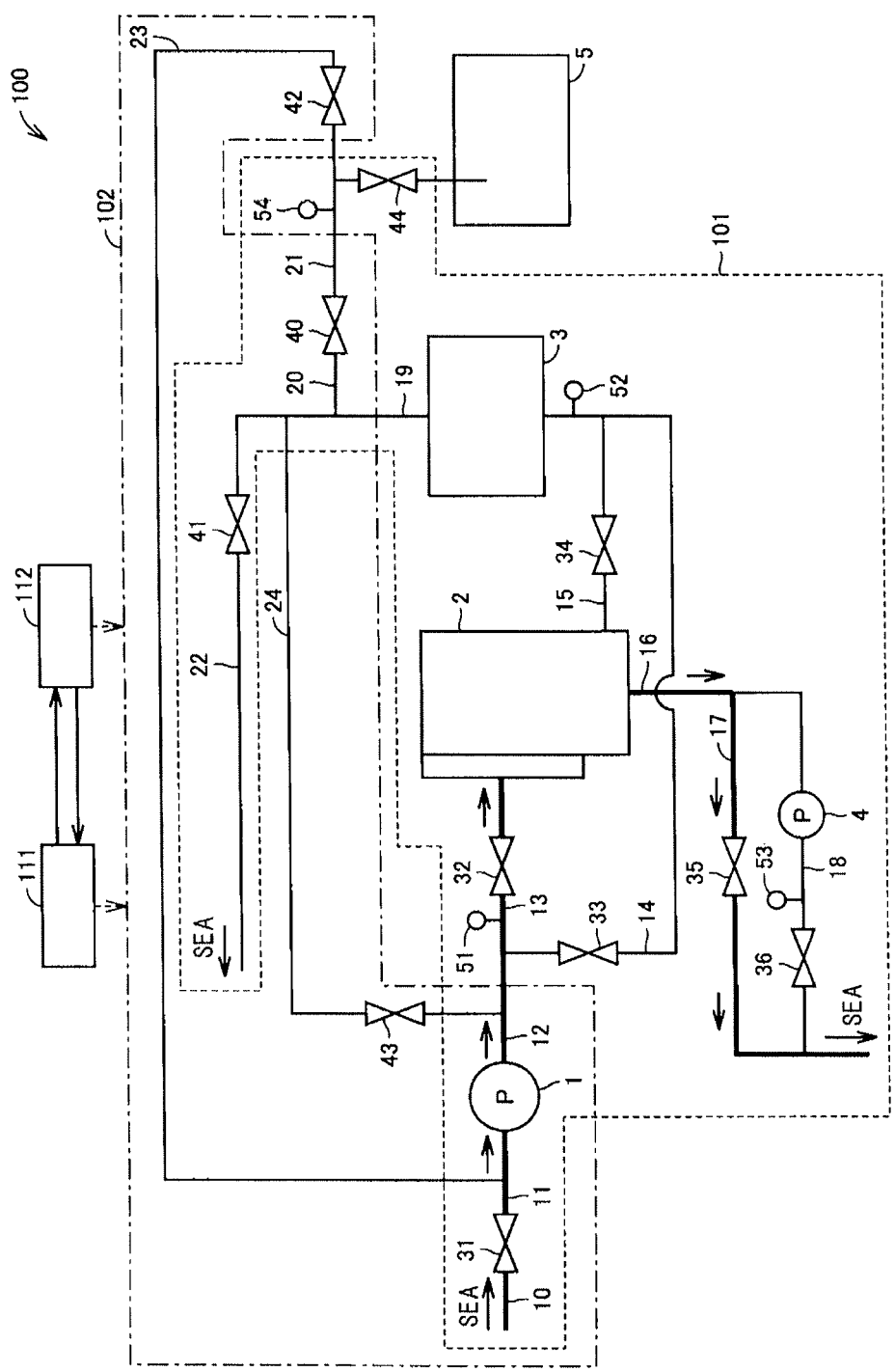
FIG. 19 is a diagram illustrating a process subsequent to the process shown in FIG. 18.

FIG. 19 is a diagram illustrating a process subsequent to the process shown in FIG. 18. Referring to FIG. 19, the control device 111 stops the drainage pump 4. Furthermore, the control device 111 closes the valve 36. Consequently, as in the process of step S101 (refer to FIG. 12), the filtering device 2 discharges untreated water from the line 16 without filtering the untreated water. Subsequently, a process of step S108 is carried out, and the ballast pump 1 is stopped. Thus, the process during water uptake (process in the Ballast mode) is finished.

3. Process in BWMS Mode (De-Ballast Mode)

Figure 20:
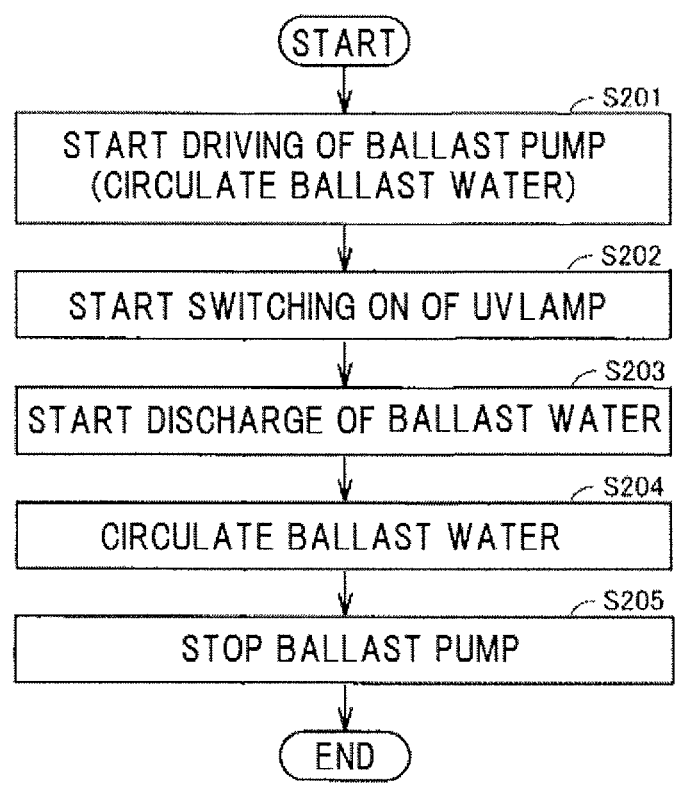
FIG. 20 is a flowchart explaining a process during discharge of ballast water, according to an embodiment of the present invention.

FIG. 20 is a flowchart explaining a process during discharge of ballast water, according to an embodiment of the present invention. An outline of a process during discharge of ballast water will be described with reference to FIGS. 1 and 20.

First, in step S201, the ballast water treatment apparatus 101 starts driving of the ballast pump 1. Valves are controlled so that ballast water stored in the ballast tank 5 is circulated in the ballast water treatment apparatus 101 by the ballast pump 1.

In step S202, switching on of the UV lamps 142 is started. When the switching on of the UV lamps 142 is completed, discharge of the ballast water is started in step S203. The ballast water is taken out from the ballast tank 5 and sent to the ultraviolet irradiation device 3. After the ballast water is irradiated with ultraviolet light, the ballast water is discharged into the sea.

In step S204, the ballast water treatment apparatus 101 circulates the ballast water again. Furthermore, the ballast water treatment apparatus 101 switches off the UV lamps 142. The circulation of the ballast water is carried out for a predetermined period of time.

In step S205, the ballast water treatment apparatus 101 stops the ballast pump 1. Thus, the process is finished.

In the present embodiment, ballast water is irradiated with ultraviolet light for a time and then discharged into the sea. As described above, during the ballast water uptake, ballast water is irradiated with ultraviolet light in order to kill microbes. However, during the ballast water uptake, microbes in water may not be completely killed. In the present embodiment, ballast water is irradiated with ultraviolet light by the ultraviolet irradiation device 3 immediately before the ballast water is discharged into the sea. This process further enhances the effect of preventing ballast water discharged into the sea from affecting the ecosystem in a seawater environment.

Since untreated water is subjected to a filtering process during the water uptake, large foreign substances have been removed from the untreated water. Accordingly, in the present embodiment, the filtering process is omitted during discharge of ballast water.

Figure 21:
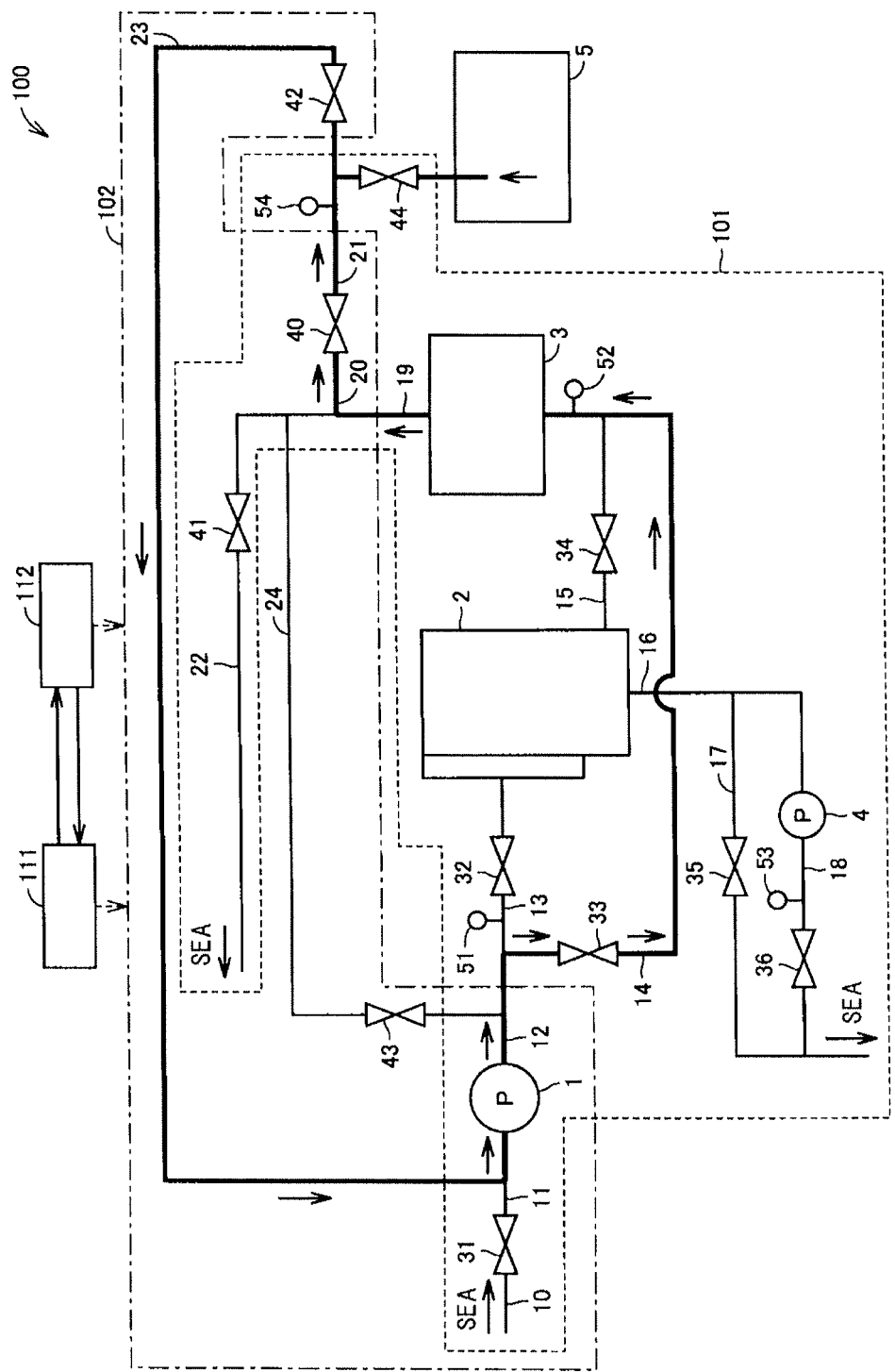
FIG. 21 is a diagram illustrating a process of steps S201 and S202 of FIG. 20.

FIG. 21 is a diagram illustrating a process of steps S201 and S202 of FIG. 20. Referring to FIG. 21, the control device 111 starts driving of the ballast pump 1. Furthermore, the control device 111 sets the valves 44, 42, 33, and 40 to an open state and sets other valves to a closed state. Ballast water in the ballast tank 5 is pumped by the ballast pump 1 and passes through the lines 23 and 11. Furthermore, the ballast water pumped from the ballast pump 1 circulates by passing through the lines 21, 23, 11, 12, 14, 19, and 20. That is, the lines 21, 23, 11, 12, 14, 19, and 20 form a circulation path in which the ballast water circulates and receives ultraviolet light emitted from the UV lamps 142 of the ultraviolet irradiation device 3.

Filtration by the filtering device 2 can be made unnecessary by allowing ballast water to pass through a path (line 14) which bypasses the filtering device 2. Accordingly, the process during discharge of ballast water can be simplified.

Furthermore, the control device 111 switches on the UV lamps 142 of the ultraviolet irradiation device 3. The UV lamps 142 can be cooled by allowing untreated water to pass through the ultraviolet irradiation device 3. Thus, it is possible to suppress overheating of the UV lamps 142 to which electricity is being supplied.

Figure 22:
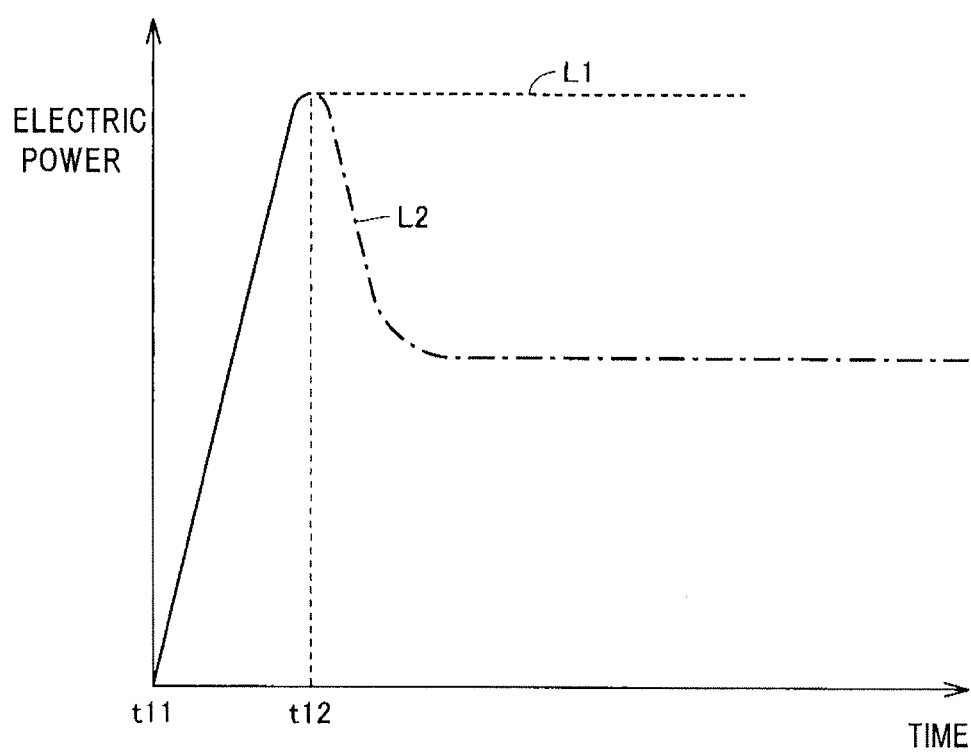
FIG. 22 is a graph illustrating a switching-on process of UV lamps during discharge of water.

FIG. 22 is a graph illustrating a switching-on process of a UV lamp during discharge of water. Referring to FIG. 22, circulation of ballast water is started in the ballast water treatment apparatus 101 at a time of t11. The control device 111 controls the lamp power supply 143 so as to supply a maximum electric power to each of the UV lamps 142. That is, the control device 111 sets a ratio of an electric power supplied to the UV lamp 142 to the maximum electric power of the UV lamp 142 to 100% and instructs the ratio (i.e., 100%) to the lamp power supply 143.

At a time of t12, the electric power supplied to the UV lamp 142 reaches the maximum electric power. The control device 111 sets, from the time of t12, the ballast water treatment apparatus to a state in which the apparatus can be operated. This process can reduce the time required until the ultraviolet irradiation process can be performed. By setting the electric power supplied to the UV lamp 142 to the maximum electric power for the UV lamp 142, the amount of irradiation of ultraviolet light applied to the ballast water can be increased. Accordingly, the ultraviolet irradiation process can be started within a short time from the start of the switching on of the UV lamps 142.

Immediately after starting pumping of ballast water from the ballast tank 5, the turbidity of the ballast water may increase temporarily. For example, it is assumed that the turbidity of the ballast water temporarily increases due to swirl of precipitate deposited in the ballast tank 5. In such a case, in order to make the amount of irradiation of ultraviolet light applied to the ballast water sufficient, for example, as shown by the straight line L1, a maximum electric power is supplied to the UV lamp 142. That is, at the time of t12 and thereafter, a state where the maximum electric power is supplied to the UV lamp 142 is continued for a certain period of time.

Subsequently, when the turbidity of the ballast water decreases, the control device 111 controls the lamp power supply 143 so that the electric power supplied to each of the UV lamps 142 decreases gradually.

Alternatively, in the case where the turbidity of untreated water is not particularly high, the control device 111 controls the lamp power supply 143 as shown by the curved line L2. That is, after the electric power supplied to each of the UV lamps 142 reaches the maximum electric power, the control device 111 controls the lamp power supply 143 so that the electric power supplied to the UV lamp 142 gradually decreases. In such a case, as in the case shown in FIG. 15, the illuminance of the UV lamp 142 temporarily reaches a peak and then gradually decreases.

During the switching-on process of the UV lamps 142, since the ballast water passes through the circulation path, the ballast water is not discharged from the ballast water treatment apparatus 101. In a state where the amount of ultraviolet irradiation is sufficient after the completion of the switching-on process of the UV lamps 142, the ballast water is irradiated with ultraviolet light and discharged from the ballast water treatment apparatus 101. Accordingly, the effect of killing microbes contained in the ballast water can be increased.

Figure 23:
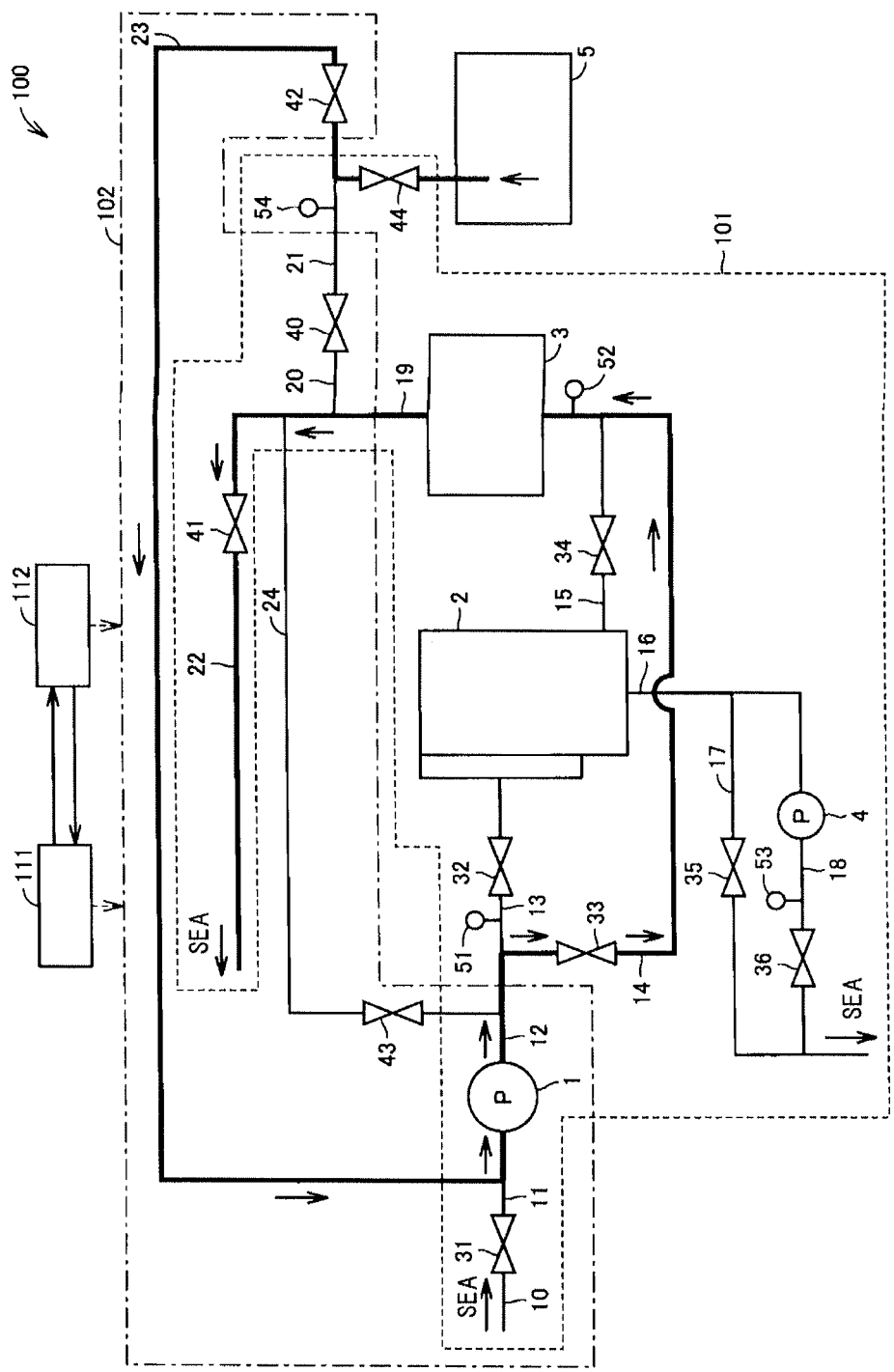
FIG. 23 is a diagram illustrating a process of step S203 of FIG. 20.

FIG. 23 is a diagram illustrating a process of step S203 of FIG. 20. Referring to FIG. 23, the control device 111 sets the valve 41 to an open state. On the other hand, the control device 111 sets the valve 40 to a closed state. Accordingly, the ballast water is irradiated with ultraviolet light when passing through the ultraviolet irradiation device 3. The ballast water then passes through the line 22 and is discharged into the sea.

The lines 21, 23, 11, 12, 14, 19, and 22 form a discharge path for discharging ballast water from the ballast tank 5 that stores the ballast water. When the ballast water passes through the discharge path and is discharged from the ballast tank 5, the ballast water is irradiated with ultraviolet light from the ultraviolet irradiation device 3. Accordingly, microbes in the ballast water can be killed.

The circulation path and the discharge path are switched by opening one of the valves 40 and 41 and closing the other valve. The valves 40 and 41 form a switching portion for switching the path through which the ballast water flows between the circulation path and the discharge path. In addition, a path formed by the lines 21, 23, 11, 12, 14, and 19 is common to the circulation path and the discharge path. As shown in FIG. 7, the UV lamps 142 are arranged between the line 15 and the line 19. That is, the UV lamps 142 are provided in the path common to the circulation path and the discharge path.

Figure 24:
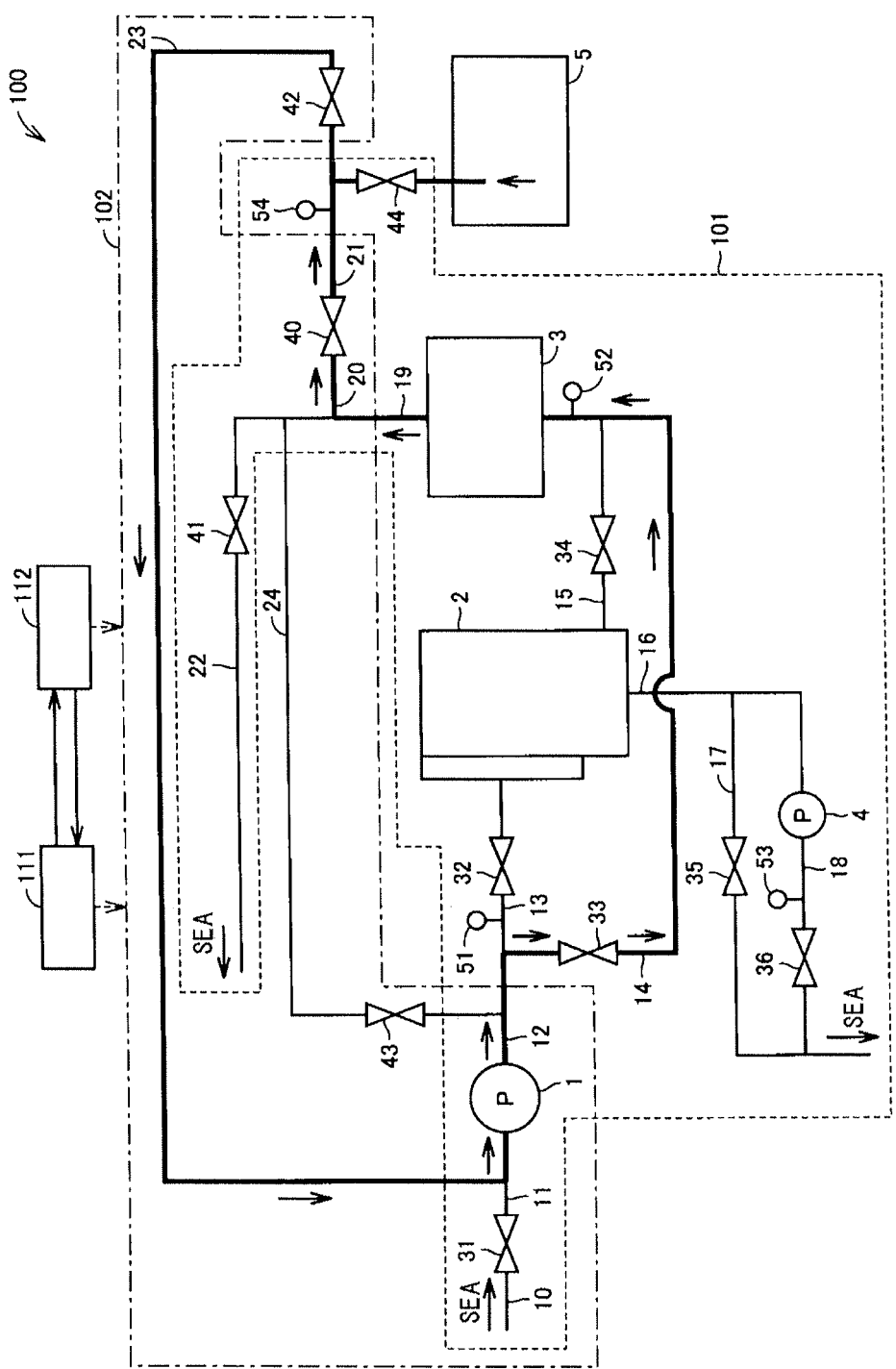
FIG. 24 is a diagram illustrating a process of step S204 of FIG. 20.

FIG. 24 is a diagram illustrating a process of step S204 of FIG. 20. Referring to FIG. 24, the control device 111 sets the valve 40 to an open state. On the other hand, the control device 111 sets the valve 41 to a closed state. Consequently, the ballast water again passes through the circulation path of the ballast water treatment apparatus 101.

Furthermore, the control device 111 switches off the UV lamps 142 of the ultraviolet irradiation device 3. After the UV lamps 142 are switched off, the control device 111 still allows untreated water to pass through the ultraviolet irradiation device 3. Accordingly, the effect of cooling the UV lamps 142 can be obtained. Subsequently, in step S205, the control device 111 stops the ballast pump 1.

4. Process in BYPASS Mode (Intake of Ballast Water)

Figure 25:
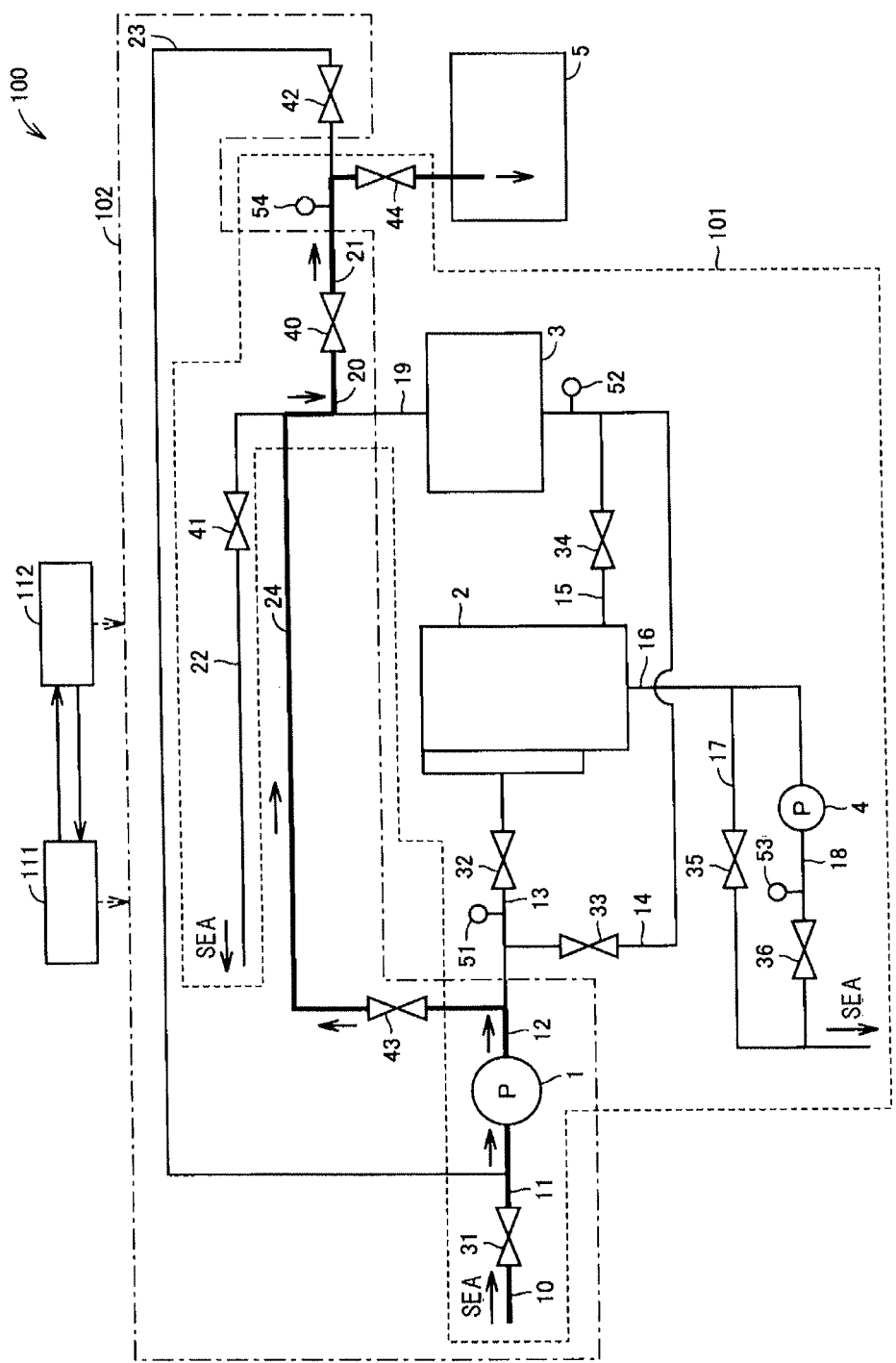
FIG. 25 is a diagram illustrating intake of ballast water in a BYPASS mode.

In the bypass mode, intake and discharge of ballast water are performed without passing through the ballast water treatment apparatus 101. FIG. 25 is a diagram illustrating intake of ballast water in the BYPASS mode. Referring to FIG. 25, the control device 111 sets the valves 31, 43, 40, and 44 to an open state and sets the other valves to a closed state. Next, the control device 111 starts driving of the ballast pump 1.

Seawater passes through the lines 10 and 11 and is pumped by the ballast pump 1. The seawater discharged from the ballast pump 1 passes through the lines 12, 24, 20, and 21 and is sent to the ballast tank 5.

5. Process in BYPASS Mode (Discharge of Ballast Water)

Figure 26:
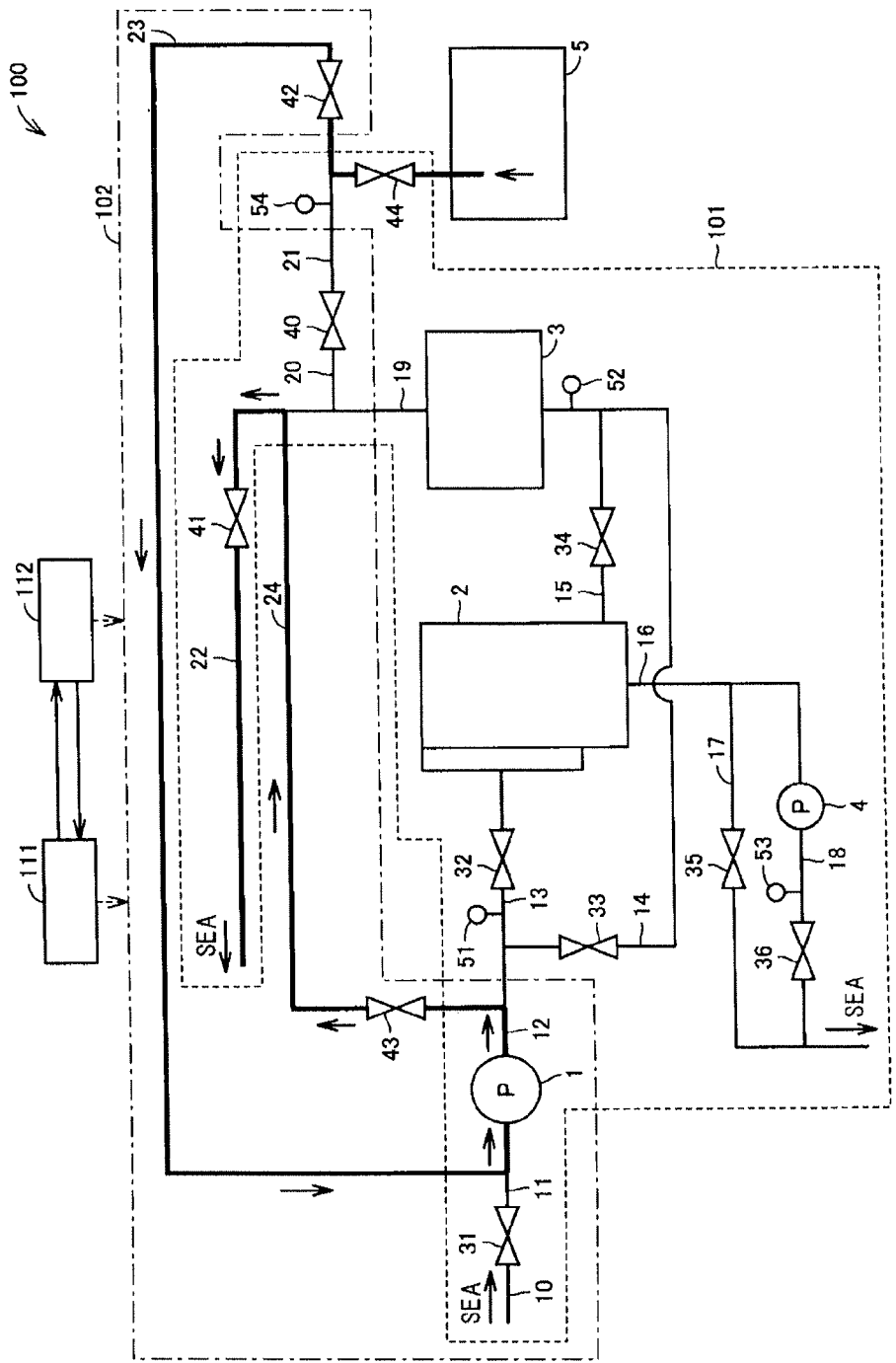
FIG. 26 is a diagram illustrating discharge of ballast water in a BYPASS mode.

FIG. 26 is a diagram illustrating discharge of ballast water in the BYPASS mode. Referring to FIG. 26, the control device 111 sets the valves 41, 42, 43, and 44 to an open state and sets the other valves to a closed state. Next, the control device 111 starts driving of the ballast pump 1.

The ballast water is pumped from the ballast tank 5 by the ballast pump 1 and passes through the lines 23 and 11. The seawater discharged from the ballast pump 1 passes through the lines 12, 24, and 22 and is discharged into the sea.

As described with reference to FIGS. 18 and 19, in the BWMS mode, after ballast water is loaded into the ballast tank 5, the filter 61 of the filtering device 2 is cleaned. In an embodiment, the filter 61 is cleaned by ejecting untreated water (seawater pumped by the ballast pump 1) onto an outer circumferential surface of the filter 61. In addition to this cleaning, reverse cleaning of the filter 61 may be performed.

Figure 27:
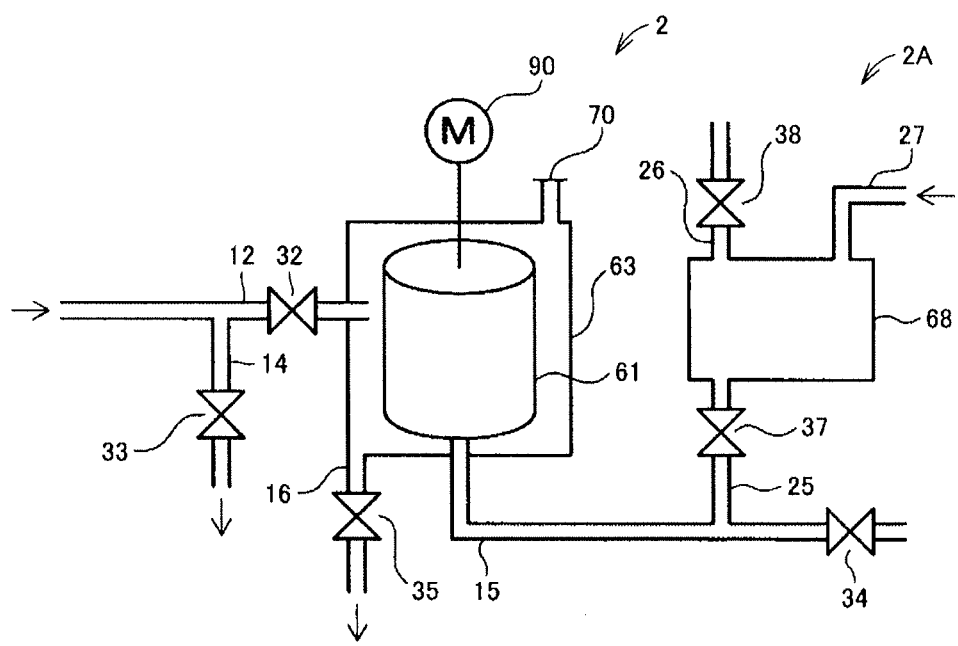
FIG. 27 is a diagram showing a structural example for performing reverse cleaning of a filter of a filtering device.

FIG. 27 is a diagram showing a structural example for performing reverse cleaning of a filter 61 of a filtering device 2. Referring to FIG. 27, a reverse cleaning device 2A includes a cleaning water tank 68, valves 37 and 38, and lines 25, 26, and 27 realized by arranging a pipe.

Next, a reverse cleaning method will be described. First, cleaning water is prepared. In a filtering process, valves 32, 35, and 34 are set to an open state, and a valve 33 and the valve 37 are set to a closed state. The valve 38 for releasing a pressure is provided in the line 26 and on an upper portion of the cleaning water tank 68. The valve 38 is set to an open state. Furthermore, the valve 37 is provided in the line 25 branched from a line 15. When the valve 37 is set to an open state, filtered water from a filtering device 2 flows in the cleaning water tank 68 and is stored in the cleaning water tank 68. When a required amount of cleaning water is stored, the valve 37 is set to a closed state. Note that filtered water may not necessarily be used as the cleaning water. For example, tap water or the like may be introduced into the cleaning water tank 68.

After the preparation of cleaning water, reverse cleaning of the filter 61 is performed. The control device 111 sets the valves 32, 33, and 35 to a closed state to stop a usual filtering process. The control device 111 sets the valve 37 to an open state and sets the valve 38 to a closed state. Thus, a case 63 of the filtering device 2 is connected to the cleaning water tank 68 through the line 15, and all the other flow paths are closed. In this state, compressed air or the like is allowed to flow in the pressurizing pipe 27 to apply a pressure to the cleaning water. The cleaning water may be pressurized in a state where the valve 37 is closed, and the valve 37 may then be opened. The inside of the whole of the case 63, the line 15, and the cleaning water tank 68 is maintained in a pressurized state.

Next, the valve 35 is opened (set to an open state). Consequently, the cleaning water passes from the cleaning water tank 68 to the line 15 and permeates through the filter 61. The cleaning water passes from the case 63 to the line 16 and is discharged to the outside at one time. That is, the cleaning water flows through the filter 61 serving as a filtration membrane within a short time in a direction opposite to a direction in which water flows during filtering. The cleaning water flows through the filtered water flow path 64 and is ejected from the intake holes 81 of the central pipe 80. The cleaning water passes through the filter 61 from an inner circumferential surface of the filter 61 to an outer circumferential surface of the filter 61. Consequently, substances, for example, adhering to the outer circumferential surface of the filter 61 are removed from the outer circumferential surface of the filter 61, and thus the filter 61 is cleaned.

After the cleaning water stored in the cleaning water tank 68 is used in reverse cleaning by application of a pressure through the above operation, the control device 111 sets the valves 32, 34, and 35 to an open state and sets the valves 33 and 37 to a closed state so that the filtering device 2 performs the usual filtering process. In this state, since cleaning water can be stored again in the cleaning water tank 68 by opening the valves 37 and 38, the cleaning operation can be repeated.

The motor 90 may be stopped during the cleaning operation. However, the motor 90 is preferably driven because a high cleaning effect is obtained by performing reverse cleaning of the filter 61 while the filter 61 is rotated. The reason for this is that, in addition to the pressure of cleaning water from the inside of the cylinder, a centrifugal force due to the rotation of the cylinder is applied to substances adhering to the outer circumferential surface of the cylindrical, pleated filter 61, and thus filtered substances are more easily removed. The filter 61 can be effectively cleaned by performing reverse cleaning of the filter 61 in a rotational state, as described above. Furthermore, even when vibrations of the whole filter 61 are added to the rotation, an increase in the effect of cleaning the filter 61 can be expected.

Furthermore, the filter 61 may be cleaned by using a chemical. As shown in FIGS. 4 and 27, a chemical inlet 70 is provided on a lid portion of the case 63. The filtering device 2 can be operated for a long period of time by performing reverse cleaning of the filter 61. However, there may be substances that cannot be removed by such a mechanical cleaning and that are gradually deposited on a surface of the filter 61. The lifetime of the filter 61 can be extended by using the cleaning with a chemical in combination.

The cleaning with a chemical can be performed by the following procedure using the chemical inlet. First, the filtering operation and the operation of reverse cleaning are stopped. The filter 61 may be stopped or may be in a rotational state. All the valves are set to a closed state so that the inside of the case 63 is maintained in a state in which untreated water or filtered water is left and the filter 61 is immersed in water. In this state, a chemical for cleaning is poured from the chemical inlet 70.

In the case where the filter 61 is already in a rotational state, the rotational state is maintained as it is. On the other hand, in the case where the filter 61 is in a stopped state, the motor 90 is rotated so that the filter 61 becomes in a rotational state. This state is maintained for a certain period of time until the chemical spreads over the rotating filter 61 and the outer circumferential surface of the filter 61 is sufficiently cleaned. Subsequently, the valve 35 is opened to discharge water (containing the chemical) in the case 63. A neutralizing solution may be further poured before the discharge of water or a process of neutralization or the like may be performed after the discharge of water depending on the type of chemical used.

As described above, according to an embodiment of the present invention, the filter of the filtering device 2 is cleaned prior to a process of supplying untreated water to the ballast tank 5, that is, a process of filtering by the filtering device 2 and a process of ultraviolet irradiation by the ultraviolet irradiation device 3. Accordingly, it is possible to reduce the possibility of poor filtration performance when the processes of untreated water (filtration by the filtering device 2 and ultraviolet irradiation by the ultraviolet irradiation device 3) are started. A decrease in the filtration performance of the filter results in a problem of, for example, a decrease in the performance for treating ballast water by a treatment apparatus. The performance of a treatment of ballast water when ballast water is loaded into a ship can be improved by cleaning the filter in advance. Accordingly, it is possible to prevent an increase in the time necessary for storing ballast water in a ballast tank.

In the present embodiment, the control devices 111 and 112 are configured as devices capable of not only controlling the ballast water management system 100 but also setting the operation mode of the ballast water management system 100 by an operator. However, the number of setting devices may be two or more, and the number of control devices of the ballast water management system 100 may be one. Specifically, the ballast water management system may be configured so that the one control device receives setting determined in the plurality of setting devices. In such an embodiment, in the case where setting of the operation mode of the ballast water management system 100 is the same among the plurality of setting devices, the control device allows the ballast water management system 100 to operate in the operation mode. Also in this configuration, it is possible to prevent the ballast water management system 100 from operating in an operation mode that is not intended by an operator. In addition, by separately arranging a plurality of setting devices in a ship, the operator can use a setting device arranged near the operator. Thus, convenience of the operator can be enhanced.

It is to be understood that the embodiments disclosed herein are only illustrative and are not restrictive in all respects. The scope of the present invention is defined not by the above description but by the claims described below, and it is intended that the scope of the present invention includes equivalents of the claims and all modifications within the scope of the claims.

The invention claimed is:

1. A ballast water treatment apparatus comprising:
a filtering device including a filter for filtering seawater and a supply port for unfiltered seawater to be filtered to enter the filtering device;
an ultraviolet irradiation device that irradiates the seawater filtered by the filter with ultraviolet light;
a first path for supplying the seawater filtered by the filtering device to the ultraviolet irradiation device;
a discharge water path for discharging the seawater remaining in the filtering device;
a first valve provided in the first path;
a second path for supplying the seawater flowing from the ultraviolet irradiation device to a ballast tank; and
a control device that, upon receiving an instruction to treat the seawater and supply it to the ballast tank, closes the first valve for cleaning the filter,
a third path for discharging the seawater flowing from the ultraviolet irradiation device outside the ultraviolet irradiation device, the third path being branched from the second path;
a second valve provided in the second path; and
a third valve provided in the third path,
wherein, when the control device closes the first valve, the filtering device is configured to clean the filter by using unfiltered seawater introduced into the filtering device through the supply port and exiting through the discharge water path before opening the first valve to allow the seawater filtered by the filtering device to be supplied to the ultraviolet irradiation device,
the ultraviolet irradiation device includes an ultraviolet lamp, and during a switching-on process of the ultraviolet lamp, the control device sets the first valve and the third valve to an open state and sets the second valve to a closed state, and when the switching on of the ultraviolet lamp is completed, the control device sets the second valve to an open state and sets the third valve to a closed state,
in the switching-on process of the ultraviolet lamp, the control device controls an electric power supplied to the ultraviolet lamp such that an illuminance of the ultraviolet lamp becomes a maximum value, and when the illuminance of the ultraviolet lamp reaches the maximum value, the control device decreases the illuminance of the ultraviolet lamp to a target value, and
after the ultraviolet lamp is switched off, the control device sets the second valve to a closed state and sets the third valve to an open state.

2. The ballast water treatment apparatus according to claim 1, further comprising a reverse cleaning device that supplies cleaning water to the filtering device through the first path.

3. A ballast water management system comprising:
the ballast water treatment apparatus according to claim 1;
a pump for supplying the seawater to the filtering device; and
a ballast tank for storing the seawater supplied through the second path.

4. The ballast water management system according to claim 3, further comprising a bypass system for feeding seawater into the ballast tank and discharging seawater from the ballast tank while bypassing the ballast water treatment apparatus.

\* \* \* \* \*